US006816929B2

(12) United States Patent
Ueda

(10) Patent No.: US 6,816,929 B2
(45) Date of Patent: Nov. 9, 2004

(54) DATA TRANSFER CONTROL METHOD AND CONTROLLER FOR UNIVERSAL SERIAL BUS INTERFACE

(75) Inventor: Kenichi Ueda, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 550 days.

(21) Appl. No.: 09/884,128

(22) Filed: Jun. 20, 2001

(65) Prior Publication Data

US 2001/0056513 A1 Dec. 27, 2001

(30) Foreign Application Priority Data

Jun. 21, 2000 (JP) .................................... P2000-186828

(51) Int. Cl.[7] .......................... G06F 13/10; G06F 13/14
(52) U.S. Cl. .......................... 710/56; 710/15; 710/53; 711/202; 711/209
(58) Field of Search ............................. 710/15, 23, 52, 710/53, 56; 711/202, 209

(56) References Cited

U.S. PATENT DOCUMENTS

| 4,845,710 | A | | 7/1989 | Nakamura et al. ........ 370/110.1 |
| 5,327,391 | A | | 7/1994 | Hirata ......................... 365/233 |
| 5,822,785 | A | | 10/1998 | Ikeda et al. .................. 711/209 |
| 5,974,486 | A | * | 10/1999 | Siddappa ..................... 710/53 |
| 6,185,641 | B1 | * | 2/2001 | Dunnihoo ..................... 710/56 |
| 6,205,501 | B1 | * | 3/2001 | Brief et al. .................. 710/100 |
| 6,266,715 | B1 | * | 7/2001 | Loyer et al. .................. 710/22 |
| 6,389,495 | B1 | * | 5/2002 | Larky et al. .................... 710/8 |
| 6,421,770 | B1 | * | 7/2002 | Huch et al. .................. 711/209 |
| 6,678,760 | B2 | * | 1/2004 | Brief ........................... 710/52 |

FOREIGN PATENT DOCUMENTS

| JP | 61-232744 | 10/1986 |
| JP | 2-40743 | 2/1990 |
| JP | 6-187297 | 7/1994 |
| JP | 6-101747 | 12/1994 |
| JP | 10-326251 | 12/1998 |
| JP | 2874375 | 1/1999 |
| JP | 11-328069 | 11/1999 |

* cited by examiner

Primary Examiner—Rehana Perveen
(74) Attorney, Agent, or Firm—Foley & Lardner LLP

(57) ABSTRACT

A USB device controller is applied to a peripheral device that performs data communications with a host by using a transmission endpoint and a reception endpoint via a USB interface. Herein, a USB endpoint controller performs data transmission and data reception by using the reduced number of memories, which contribute to downsizing of the circuit scale of the USB device controller. The USB endpoint controller contains a transmission control block, a reception control block and a buffer switch control block as well as the memories. The buffer switch control block controls allocation of the memories to a transmission endpoint and a reception endpoint respectively in response to a type of a token issued from the host. In response to an OUT token, the data transmission is performed on the transmission endpoint that actualizes a double buffer configuration while the reception endpoint is also available in data reception by a single buffer configuration. In response to an IN token, the data reception is performed on the reception endpoint that actualizes a double buffer configuration while the transmission endpoint is also available in data transmission by a single buffer configuration. Because of the actualization of the double buffer configuration, it is possible to perform high-speed processing in communications of data, particularly transaction data based on the updated standard of USB 2.0.

11 Claims, 15 Drawing Sheets

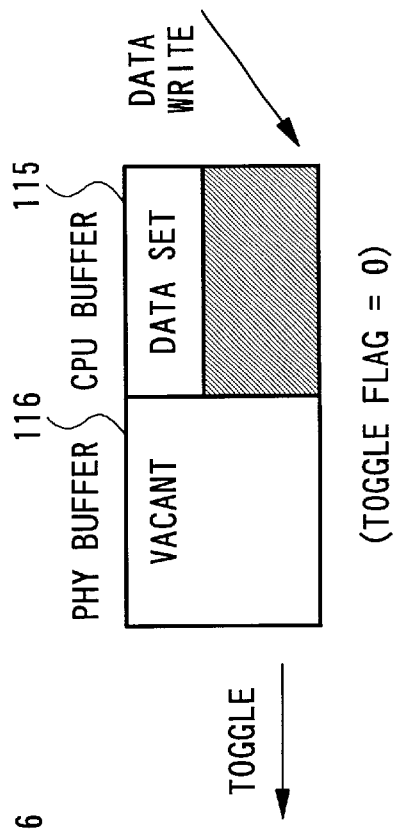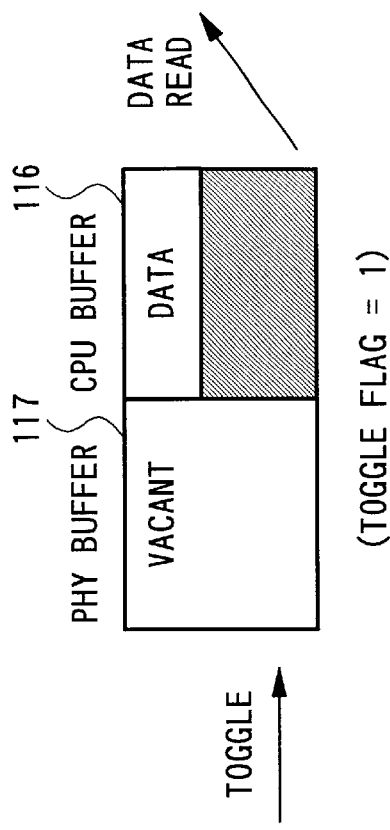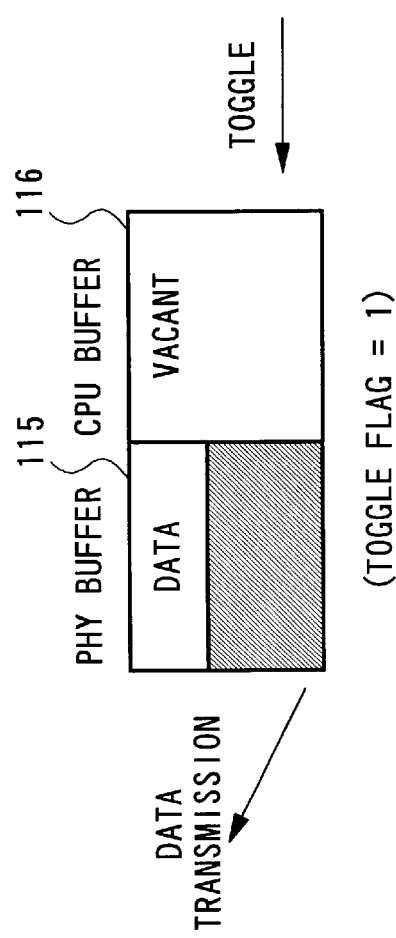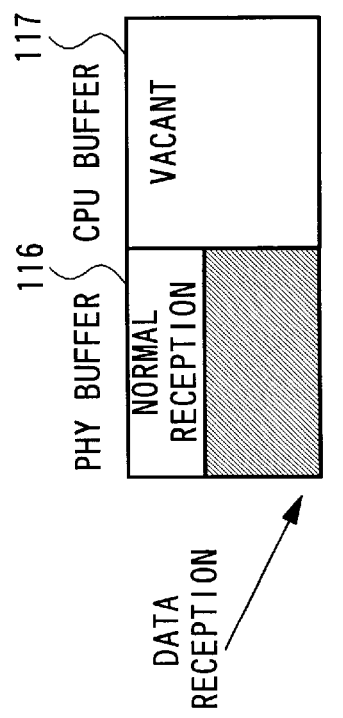

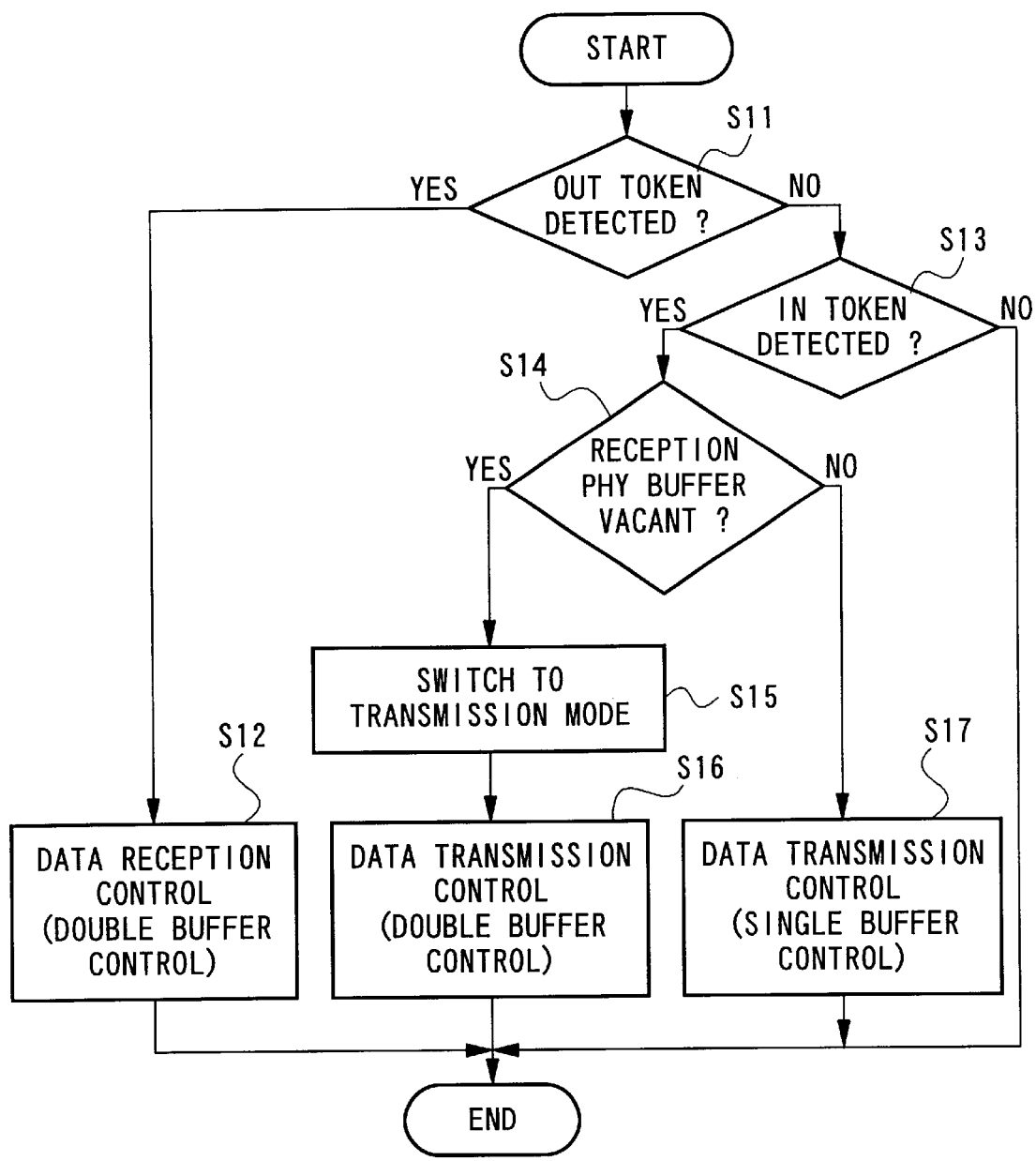

DATA TRANSFER CONTROL METHOD AND CONTROLLER FOR UNIVERSAL SERIAL BUS INTERFACE

BACKGROUND OF THE INVENTION

1. Field of the Invention

This invention relates to data transfer control methods and controllers for universal serial bus (USB) interfaces that are used to interconnect host computers and peripheral devices together. Particularly, this invention relates to USB endpoint controllers that are installed in the peripheral devices to control communications with the host computers such as personal computers by the USB interfaces. The USB endpoint controllers are designed to provide high communications performance to the peripheral device such as hard-disk devices.

2. Description of the Related Art

Due to the worldwide popularization in use of the USB interfaces for personal computers and peripheral devices, there are strong tendencies in providing multiple functions for the peripheral devices having USB-compatible interfaces. Recently, manufacturers tend to provide the peripheral devices with complex functions. This gives rise to the necessities to increase the numbers of endpoints that correspond to destination of data transmission and reception in the viewpoints of the host computers such as the personal computers. Generally speaking, buffers configured by memories are allocated to the endpoints respectively. Therefore, the endpoints have buffering functions of data that are communicated between the host computers and peripheral devices.

The new standard of USB 2.0 whose specifications are updated in these days is expected as the future mainstream technology for the communications between the hosts and peripherals. It is determined that the standard USB 2.0 provides forty-times higher transfer speeds (i.e., 480 Mbps) as compared with the conventional ones. Accelerating the data transfer speeds noticeably increase maximal sizes of packets that are allowed by the standard USB 2.0. In the case of the bulk transfer that is suitable for transferring plenty of data, for example, the conventional standard USB 1.1 only allows the maximal packet size of sixty-four bytes, while the new standard USB 2.0 allows a broad range of packet sizes that range between one byte and 512 bytes. This means that the new standard allows maximally the eight-times larger size of packets as compared with the conventional one. As a result, the new standard inevitably increases the capacities of the buffers for use in the endpoints.

To realize the data transfer at a speed of 480 Megabits per second (or 480 Mbps), the new standard USB 2.0 requests the peripheral devices to have high performance in communications. To realize the high performance of communications in the peripheral devices, it is possible to propose the method for transferring plenty of data using double buffer configurations.

FIG. 15 shows a conventional example of a USB device controller 500 that actualizes the double buffer configuration. That is, the USB device controller 500 has a USB interface 501, a USB endpoint controller 502 and an external bus interface 503.

The USB interface 501 provides an interface for controlling a USB bus, by which data communications are performed with a host computer (not shown).

The external bus interface 503 provides an external bus interface for controlling a CPU or a DMA (i.e., Direct Memory Access) controller of a peripheral device (not shown).

The USB endpoint controller 502 configures an endpoint realizing a buffering function for data being communicated between the host computer and the USB interface 501. That is, the USB endpoint controller 502 has a transmission control block 504 and a reception control block 509 as well as a pair of transmission memories 521, 522 and a a pair of reception memories 523, 524. The transmission control block 504 accumulates data input by the external bus interface 530 in the transmission memories 521 and 522. In addition, it reads the accumulated data from the transmission memories 521, 522 to send them to the USB interface 501. In this case, the transmission control block 504 alternately switches over functions of the transmission memories 521 and 522. That is, one transmission memory is used to accumulate the input data from the external bus interface 503, while another transmission memory is used to output the accumulated data to the USB interface 501. Alternately switching over the functions of the transmission memories 521 and 522, it is possible to simultaneously perform the data accumulation and transfer with respect to the input data of the external bus interface 503. This brings an improvement in the communications performance of the peripheral device.

The reception control block 509 accumulates data input by the USB interface 501 in the reception memories 523 and 524. In addition, it reads the accumulated data from the reception memories 523 and 524 to send them to the external bus interface 503. As similar to the transmission control block 504 for alternately switching over functions of the transmission memories 521 and 522, the reception control block 509 alternately switches over functions of the reception memories 523 and 524. Hence, it is possible to simultaneously perform the data accumulation and transfer with respect to the input data of the USB interface 501.

Another example of the USB device controller is disclosed by Japanese Unexamined Patent Publication No. Hei 11-328069, which is characterized by using dual port memories for transmission and reception buffers.

With reference to FIG. 16, a USB device controller 600 using dual port memories is configured by a USB interface 601, a USB endpoint controller 602 and an external bus interface 603.

The USB endpoint controller 602 contains a transmission address setup control block 631 and a reception address setup control block 635 as well as a transmission dual port memory 638 and a reception dual port memory 639.

The transmission address setup control block 631 performs setup controls on addresses for the transmission dual port memory 638 with respect to each endpoint, while the reception address setup control block 635 performs setup controls on addresses for the reception dual port memory 639 with respect to each endpoint. Thus, it is possible to dynamically set the sizes and numbers of the transmission and reception buffers, so it is possible to efficiently use the memories in the USB endpoint controller 600.

A further example of the USB device controller is disclosed by Japanese Unexamined Patent Publication No. Hei 10-326251, which is characterized by dynamically allocating areas of the memory space to packets that are subjected to buffering.

With reference to FIG. 17, a USB device controller 700 for dynamically allocating areas of the memory space to packets is configured by a USB interface 701, a USB endpoint controller 702 and an external bus interface 703.

The USB endpoint controller 702 contains a DMA controller 740, an arbiter 742, a reception cue 743, a transmission cue 744, a memory manager 745, a map RAM 746 and a RAM 747.

The DMA controller 740 provides a cue control 741 therein. The RAM 747 functions as buffers for accumulating transmission and reception data. That is, packet data of the reception cue 743 and the transmission cue 744 are buffered in the RAM 747.

The arbiter 742 mediates accesses to the RAM 747 between the DMA controller 740 and the external bus interface 703. Thus, it enables asynchronous accesses to the RAM 747 from both sides.

The memory manager 745 and the map RAM 746 divide the overall area of the RAM 747 into plural areas. The cue control 741 controls the reception cue 743 and the transmission cue 744 so that their packet data are respectively accumulated in the divided areas of the RAM 747 respectively. Then, the accumulated data are read from the areas of the RAM 747 respectively.

The USB device controller 500 of FIG. 15 can improve the communications performance, however, it needs double sizes or capacities of memories for configuring the double buffers, which raises problems due to large circuit scales. If a chip of the aforementioned USB device controller is designed based on the new standard USB 2.0 that requires multiple functions and large capacities, it must increase the manufacturing cost so much.

The USB device controller 600 of FIG. 16 is designed such that address setup controls are made with intervention of the CPU, which inevitably causes intermittent suspension in transmission and reception of data during setup operations of addresses. This decreases the communications performance, so a load to the device driver should become increased. If the aforementioned USB device controller is designed based on the new standard USB 2.0 that further increases the data transfer speed, it is necessary to increase the processing speed of the USB endpoint controller, which is a bottleneck problem for the aforementioned USB device controller.

The USB device controller 700 of FIG. 17 needs memories for configuring the reception cue 743 and the transmission cue 744 respectively. In addition, it also needs special controls for the memory manager 745 and the arbiter 742. That is, the aforementioned USB device controller increases the scale of the peripheral circuitry of the memory. Further, the communications performance may be deteriorated if the data reception hold conditions continue because the reception buffer area is not secured in the memory area due to dynamic allocation of areas to packet data. Particularly, if the memory is occupied with transmission data due to the dynamic allocation, it is necessary to buffer the transmission data until arrival of an IN token from the host. Under the aforementioned condition, the UBS device controller cannot accept data, regardless of arrival of an OUT token from the host.

In addition, it is necessary to use packet identification numbers in handling the transmission data and reception data in the aforementioned USB device controller. That is, packet identification numbers are respectively allocated to the transmission data to be written to the memory, and then the reception data are read from the memory with reference to the packet identification numbers. Therefore, a load to the device driver becomes increased. Particularly, if the aforementioned USB device controller is designed based on the new standard USB 2.0 that further increases the data transfer speed, it is necessary to increase the processing speed of the USB endpoint controller, which is a bottleneck problem for the aforementioned USB device controller.

As described above, the conventional techniques have a difficulty of application to the new standard USB 2.0 because of the so-called 'trade-off' relationship being established between the circuit scale (or buffer capacity) and communications performance of the USB device controller. So, it is very difficult to meet the requirements of the new standard USB 2.0 by the conventional techniques.

SUMMARY OF THE INVENTION

It is an object of the invention to provide a data transfer method and a USB device controller that meets the requirements of the new standard USB 2.0 to demonstrate high communications performance while minimizing the circuit scale as small as possible.

A USB device controller of this invention is applied to a peripheral device that performs data communications with a host by using a transmission endpoint and a reception endpoint via a USB interface. Herein, a USB endpoint controller performs data transmission and data reception by using the reduced number of memories, which contribute to downsizing of the circuit scale of the USB device controller. The USB endpoint controller contains a transmission control block, a reception control block and a buffer switch control block as well as the memories. The buffer switch control block controls allocation of the memories to a transmission endpoint and a reception endpoint respectively in response to a type of a token issued from the host. In response to an OUT token, the data transmission is performed on the transmission endpoint that actualizes a double buffer configuration while the reception endpoint is also available in data reception by a single buffer configuration. In response to an IN token, the data reception is performed on the reception endpoint that actualizes a double buffer configuration while the transmission endpoint is also available in data transmission by a single buffer configuration. Because of the actualization of the double buffer configuration, it is possible to perform high-speed processing in communications of data, particularly transaction data based on the updated standard of USB 2.0.

For example, the USB endpoint controller contains three memories that are assigned as function-specified buffers and a common buffer respectively. Therefore, a first endpoint corresponding to one of the transmission endpoint and the reception endpoint actualizes a double buffer configuration using the function-specified buffer and the common buffer while a second endpoint corresponding to the other one actualizes a single buffer configuration using the function-specified buffer thereof. Herein, when a read buffer selected from among the function-specified buffer and the common buffer being allocated to the first endpoint becomes vacant, it is newly allocated to the second endpoint to allow actualization of the double buffer configuration.

BRIEF DESCRIPTION OF THE DRAWINGS

These and other objects, aspects and embodiments of the present invention will be described in more detail with reference to the following drawing figures, of which:

FIG. 3A diagrammatically shows a relationship between two buffers included in the double buffer configuration of the transmission endpoint at a toggle flag '1' indicating data transmission;

FIG. 3B diagrammatically shows a relationship between the two buffers included in the double buffer configuration of the transmission endpoint at a toggle flag '0' indicating data write operations;

FIG. 4A diagrammatically shows a relationship between two buffers included in the double buffer configuration of the reception endpoint at a toggle flag '0' indicating data reception;

FIG. 4B diagrammatically shows a relationship between the two buffers included in the double buffer configuration of the reception endpoint at a toggle flag '1' indicating data read operations;

FIG. 7 is a flowchart showing a first mode switch process by which a transfer mode of a USB endpoint controller shown in FIG. 2 is switched from a reception mode to a transmission mode;

DESCRIPTION OF THE PREFERRED EMBODIMENTS

This invention will be described in further detail by way of examples with reference to the accompanying drawings.

[A] First Embodiment

Figure 1:
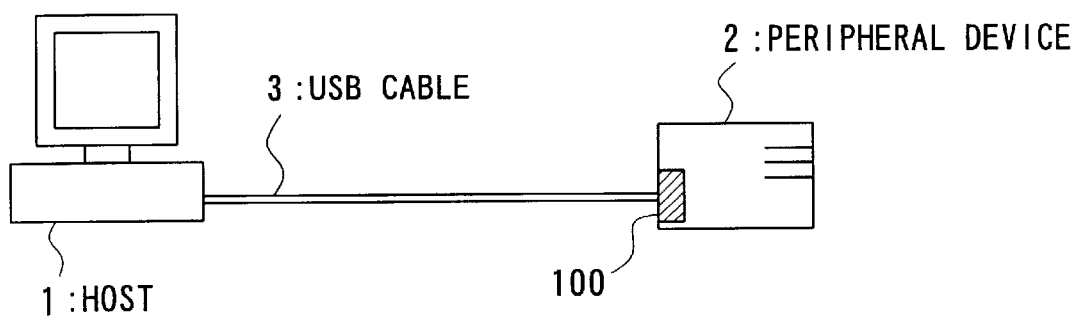
FIG. 1 shows an outline of a system configuration showing interconnection between a host and a peripheral device.

FIG. 1 shows a simple system configuration in which a host 1 such as a personal computer is connected with a peripheral device 2 such as a printer by way of a USB cable 3.

The peripheral device 2 provides a USB device controller 100 that is connected with the USB cable 3 and that is used to perform data communications with the host 1.

Figure 2:
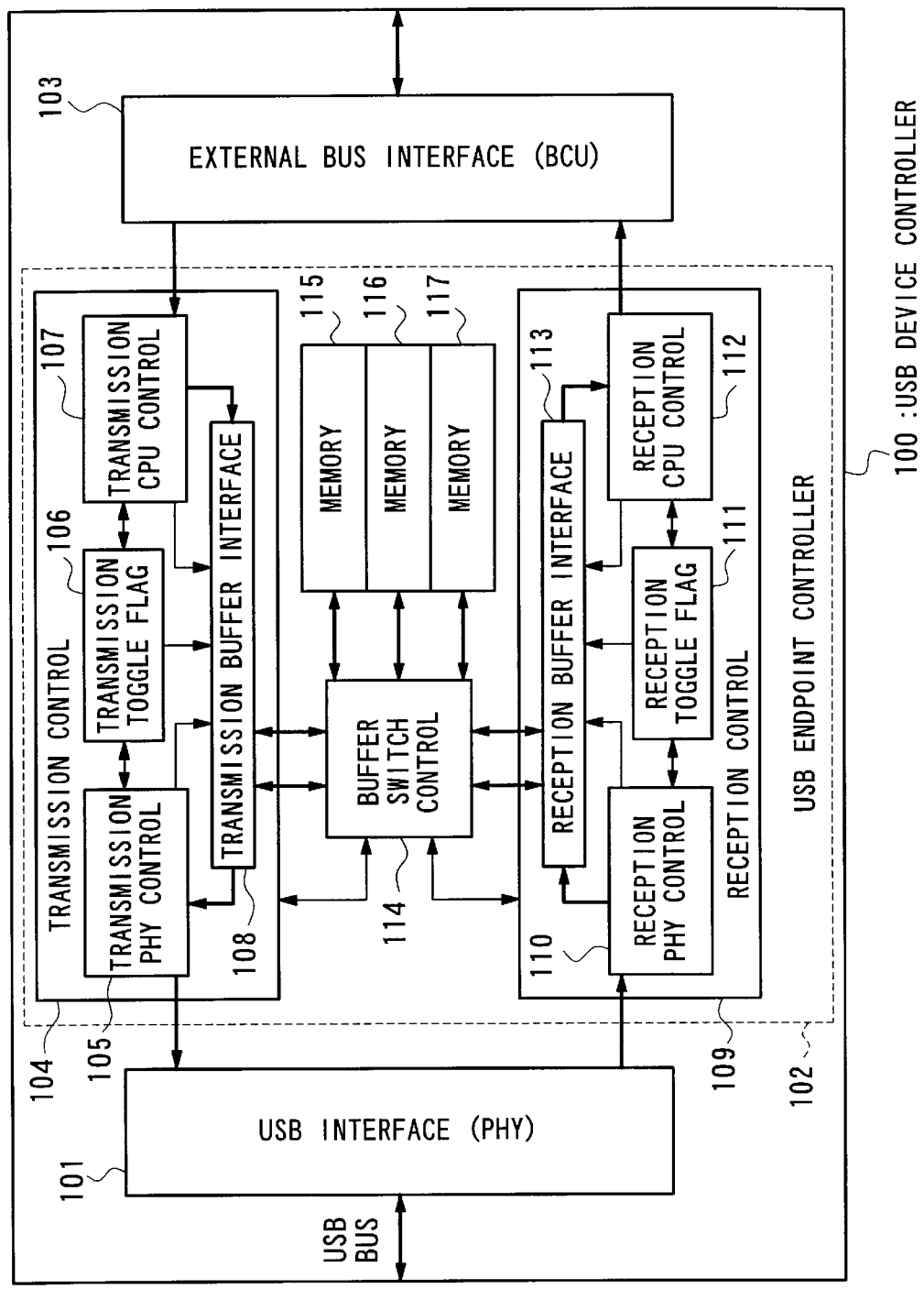
FIG. 2 is a block diagram showing a configuration of a USB device controller in accordance with a first embodiment of the invention.

FIG. 2 shows a detailed configuration of the USB device controller 100 in accordance with a first embodiment of the invention. Herein, the USB device controller 100 is basically configured by a USB interface (PHY) 101, a USB endpoint controller 102 and an external bus interface (BCU that stands for 'Bus Control Unit') 103.

The USB interface 101 is configured by an analog transceiver and a serial interface engine, both of which is not shown in FIG. 2. That is, the USB interface 101 mainly performs serial-to-parallel conversion as well as analysis and creation of packets based on the USB protocols, so that it controls the interface with the USB bus 3 to enable data communications with the host 1.

The external bus interface 103 controls a bus interconnected with a CPU or a DMA controller of a peripheral device (not shown), so that it performs data communications with the peripheral device.

The USB endpoint controller 102 configures destination of data transmission and reception for the peripheral device 2 in the viewpoint of the host 1. Specifically, it configures a reception endpoint for receiving data from the host 1 and a transmission endpoint for transmitting data to the host 1. That is, the USB endpoint controller 102 corresponds to portions for buffering transmission data and reception data. The present embodiment describes the USB endpoint controller 102 to have a pair of the transmission endpoint and reception endpoint.

In addition, the USB endpoint controller 102 can actualize a double buffer configuration by selecting either the transmission endpoint or reception endpoint in accordance with the prescribed conditions. That is, the USB endpoint controller 102 controls the transmission endpoint to actualize the double buffer configuration during a data transmission mode, and it also controls the reception endpoint to actualize the double buffer configuration during a data reception mode. While one endpoint works as the double buffer configuration, another endpoint works as a single buffer configuration to perform transmission or reception of data by securing a single buffer therefore. This allows the USB endpoint controller 102 to cope with requests of transmission and reception, which is arbitrarily issued by the host 1, during a data transfer mode of the USB interface 101 in which transmission and reception timings of data are being managed by the host 1.

Suppose that the transmission endpoint actualizes the double buffer configuration using two memories, namely a CPU buffer and a PHY buffer. In this case, the transmission endpoint can perform write operations of transmission data to the CPU buffer while simultaneously performing read operations of transmission data from the PHY buffer. If the reception endpoint actualizes the double buffer configurations using a CPU buffer and a PHY buffer, it can perform write operations of reception data to the PHY buffer while simultaneously performing read operations of reception data from the CPU buffer.

The USB endpoint controller 102 contains a transmission control block 104, a reception control block 109 and a buffer switch control block 114 as well as three memories 115, 116 and 117.

The buffer switch control block 114 makes a determination as to which of the transmission endpoint and reception endpoint is controlled to actualize the double buffer configuration. That is, the buffer switch control block 114 send instructions to the transmission control block 104 and reception control block 109, so that it assigns each of the memories 115, 116 and 117 as a transmission buffer or reception buffer.

One of the memories 115–117 is assigned as a transmission-specified buffer, while another one is assigned as a reception-specified buffer. Remaining one is assigned as a common buffer that is commonly shared between the transmission endpoint and reception endpoint. To actualize the double buffer configuration for the transmission endpoint, the common buffer is used as a transmission buffer. To actualize the double buffer configuration for the reception endpoint, the common buffer is used as a reception buffer. Incidentally, assignment of the memories 115–117 to the transmission-specified buffer, reception-specified buffer and common buffer is not necessarily made in a fixed manner. That is, assignment can be adequately changed over. For example, if one of two memories originally used for the double buffer configuration becomes vacant, it can be reassigned as a common buffer.

The transmission control block 104 contains a transmission PHY control block 105, a transmission toggle flag block 106, a transmission CPU control block 107 and a transmission buffer interface 108.

The transmission PHY control block 105 performs transmission controls of data with respect to the host 1. In this case, two memories are used for the double buffer configuration consisting of the transmission-specified buffer and the common buffer, which is assigned as the transmission buffer. The transmission PHY control block 105 read data from these buffers to output them. In response to the double buffer configuration, the transmission PHY control block 105 provides two read counters (not shown) corresponding to the two memories respectively, so it outputs read addresses with respect to each of the two memories.

The transmission CPU control block 107 writes data, output from the external bus interface 103, to the aforementioned two buffers included in the double buffer configuration. The transmission CPU control block 107 provides two write counters (not shown) corresponding to the two memories respectively, so it outputs write addresses with respect to each of the two memories.

The transmission toggle flag block 106 performs management as to which of the two memories of the double buffer configuration is to be assigned as the CPU buffer or PHY buffer. Herein, its sets the transmission toggle flag to one of two states to realize switching between the PHY buffer and CPU buffer. When the PHY buffer completes data transmission and becomes vacant, its transmission toggle flag is changed over if some data is still written in the CPU buffer.

Providing a write address representing the memory that presently acts as the CPU buffer based on the prescribed state of the transmission toggle flag, the transmission buffer interface 108 writes data, which are output from the transmission CPU control block 107, to the memory. Providing a read address representing the memory that presently acts as the PHY buffer, the transmission buffer interface 108 reads data from the memory to send them to the transmission PHY control block 105.

The reception control block 109 contains a reception PHY control block 110, a reception toggle flag block 111, a reception CPU control block 112 and a reception buffer interface 113.

The reception PHY control block 110 performs reception controls of data with respect to the host 1. Herein, two memories are used for the double buffer configuration that consists of the reception-specified buffer and the common buffer, which is assigned as the reception buffer. The reception PHY control block 110 writes output data of the host 1 to these buffers. The reception PHY control block 110 has two write counters (not shown) corresponding to the two memories of the double buffer configuration respectively, so it outputs write addresses with respect to each of the memories.

The reception CPU control block 112 performs transmission controls of data with respect to the peripheral device 2. That is, it reads data from the aforementioned buffers of the double buffer configuration to output them to the external bus interface 103. The reception CPU control block 112 has two read counters (not shown) corresponding to the two memories of the double buffer configuration respectively, so it outputs read addresses with respect to each of the memories.

The reception toggle flag block 111 performs management as to which of the memories of the double buffer configuration is to be assigned as the CPU buffer or PHY buffer. Herein, it sets the reception toggle flag to one of two states to realize switching between the CPU buffer and PHY buffer. When the CPU buffer completes data transmission and becomes vacant, the reception toggle flag block 111 changes over the reception toggle flag if some data is still written in the PHY buffer.

Providing a write address representing the memory that presently acts as the PHY buffer based on the prescribed state of the reception toggle flag, the reception buffer interface 113 writes data, which are output from the reception PHY control block 110, to the memory. Providing a read address representing the memory that presently acts as the CPU buffer, the reception buffer interface 113 reads data from the memory to send them to the reception CPU control block 112.

In the USB endpoint controller 102, the buffer switch control block 114 controls the transmission endpoint to actualize the double buffer configuration during the data transmission mode in accordance with the prescribed conditions. Herein, the double buffer configuration consists of two memories that correspond to the CPU buffer and PHY buffer respectively. These buffers are alternately switched over by the transmission buffer interface 108 in accordance with instructions given from the transmission toggle flag block 106. Thus, data that are input to the CPU control block 107 from the external bus interface 103 are written to the memory corresponding to the CPU buffer, while the transmission PHY control block 105 reads data from the memory corresponding to the PHY buffer to send them to the USB interface 101.

In addition, the buffer switch control block 114 controls the reception endpoint to actualize the double buffer configuration during the reception mode in accordance with the prescribed conditions, wherein the double buffer configuration consists of two memories that correspond to the CPU buffer and PHY buffer respectively. These buffers are alternately switched over by the reception buffer interface 113 in accordance with instructions given from the reception toggle flag block 111. Thus, data that are input to the reception PHY control block 110 from the USB interface 101 are written to the memory corresponding to the PHY buffer, while the reception CPU control block 112 reads data from the memory corresponding to the CPU buffer to send them to the external bus interface 103.

The concrete operations of the transmission endpoint actualizing the double buffer configuration will be described with reference to FIGS. 3A and 3B. Herein, normal transmission is completed under the state where all data are completely read from the memory 116 that is presently assigned as the PHY buffer. Under the aforementioned state, if there exist some data that have been already written to the memory 115 which is assigned as the CPU buffer, the transmission toggle flag block 106 changes the transmission toggle flag to change over the buffer function of the memory 116.

Due to the aforementioned control to adequately change the transmission toggle flag, it is possible to realize the time sharing control in which during the data transmission using one memory, next transmission data is written to another memory.

Incidentally, if the transmission endpoint has a single buffer configuration in which a single memory is only assigned as a buffer, there is no need to switch over the buffer. Hence, it is impossible to write next transmission data to the buffer until the buffer completes data transmission and becomes vacant.

The concrete operations of the reception endpoint will be described with reference to FIGS. 4A and 4B. If there exist some data that have been completed in normal reception and that have been already written to the memory 116 which is assigned as the PHY buffer under the state where all data are completely read from the memory 117 that is assigned as the CPU buffer, the reception toggle flag block 111 changes the reception toggle flag to change over the buffer function of the memory 117.

Due to the aforementioned control to adequately change the reception toggle flag, it is possible to realize the time sharing control in which during data read operations using one memory, next reception data is written to another memory.

Incidentally, if the reception endpoint has a single buffer configuration in which a single memory is only assigned as a buffer, there is no need to switch over the buffer. Hence, it is impossible to receive next reception data until the buffer completes the data read operations and becomes vacant.

Next, the general procedures of the data transfer using the universal serial bus (USB) will be described in detail.

Normally, the USB transfer process is made by plural units of transferring data (namely, transaction data). In the case of the printing process of the printer, for example, it is necessary to transfer data from the host 1 to the peripheral device 2 (i.e., printer). In this case, the USB transfer process is made by multiple OUT transaction data.

Figure 5:
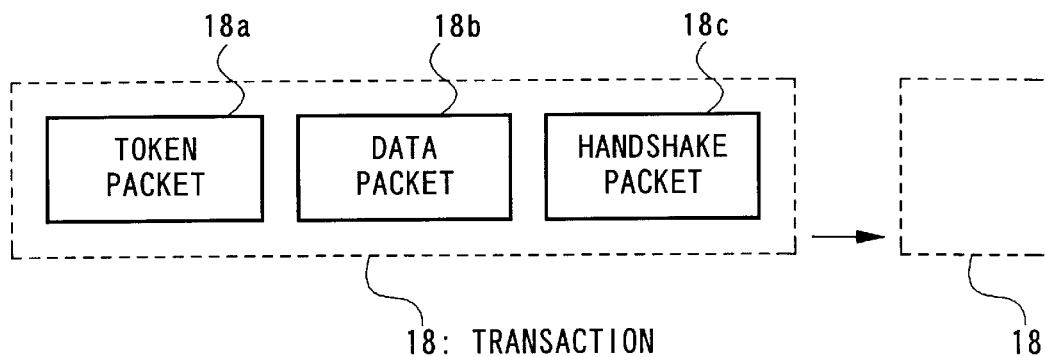
FIG. 5 shows an example of a configuration of transaction data that are handled by the USB device controller and are transferred between the host and peripheral device by way of a USB.

FIG. 5 shows an example of a configuration of transaction data.

With reference to FIG. 5, transaction data 18 is configured by three packets, namely a token packet 18a, a data packet 18b and a handshake packet 18c. First, the host 1 transfers the token packet 18a, which contains a device address and endpoint information, to the device. Normally, the token packet 18a is decoded by the USB interface 101. Due to decoding, if the device recognizes that the token is addressed thereto, it determines an endpoint to which a data transfer job is to be assigned. Then, the USB interface 101 sends a corresponding endpoint number and a type of the token to the USB endpoint controller 102.

Upon receipt of the endpoint number and the type of the token, the USB endpoint controller 102 makes a preparation for transmission or reception of the data packet 18b.

If the transaction data 18 is OUT transaction data indicating reception, the USB interface 101 makes a determination as to which of reception endpoints is used to receive the data with reference to the OUT token packet 18a that is firstly sent thereto. Hence, the determined reception endpoint proceeds to reception of the data packet 18b that is sent from the host 1.

In the case of the USB device controller 100 of the present embodiment, the USB interface 101 converts serial data to parallel data, which are stored in the memory that is assigned as the reception buffer.

Next, the USB device controller 100 makes a decision as to whether the data (i.e., data packet 18b) is received without errors and is normally stored in the memory or not. That is, it communicates a decision result using the handshake packet 18c to the host 1. Specifically, the USB endpoint controller 102 transfers handshake information to the USB interface 101, which in turn produces the corresponding handshake packet 18c. Then, the handshake packet 18c is transmitted onto the USB.

Normally, the USB transfer data (i.e., the prescribed type of data being transferred via the USB based on the USB standard) are configured by the prescribed number of consecutive transaction data '18'. In the case of the data reception, for example, they are configured by plural OUT transaction data. Therefore, if the reception endpoint actualizes the double buffer configuration, it is possible to perform the time sharing controls in which while the peripheral data 2 reads in data using one memory (i.e., CPU buffer), another memory (i.e., PHY buffer) is used to receive next data.

Suppose that the peripheral device 2 corresponds to a scanner that captures an image by scanning and converts it to image data. In order to actualize transfer of the image data from the scanner to the host 1, the USB transfer data are configured by plural IN transaction data.

The IN transaction data indicating transmission contains an IN token packet (18a) that is arranged in a first position thereof Based on the IN token packet, a determination is made as to which of transmission endpoints is used to transmit the data. Then, the determined transmission endpoint proceeds to transmission of the data packet 18b.

In the case of the USB device controller 100 of the present embodiment, the USB interface 101 performs parallel-to-serial conversion on the data stored in the transmission buffer, so that parallel data are produced as the data packet 18b and are transmitted to the host 1. With reference to the handshake packet 18c that is returned from the host 1, the USB endpoint controller 102 recognizes whether transmission of the data is made successfully or not.

Normally, the data transmission process is made by plural IN transaction data '18'. Hence, if the transmission endpoint actualizes the double buffer configuration, it is possible to perform the time sharing controls in which during the data transmission using one memory (i.e., PHY buffer), next data from the peripheral device 2 is written to another memory (i.e., CPU buffer).

Figure 15:
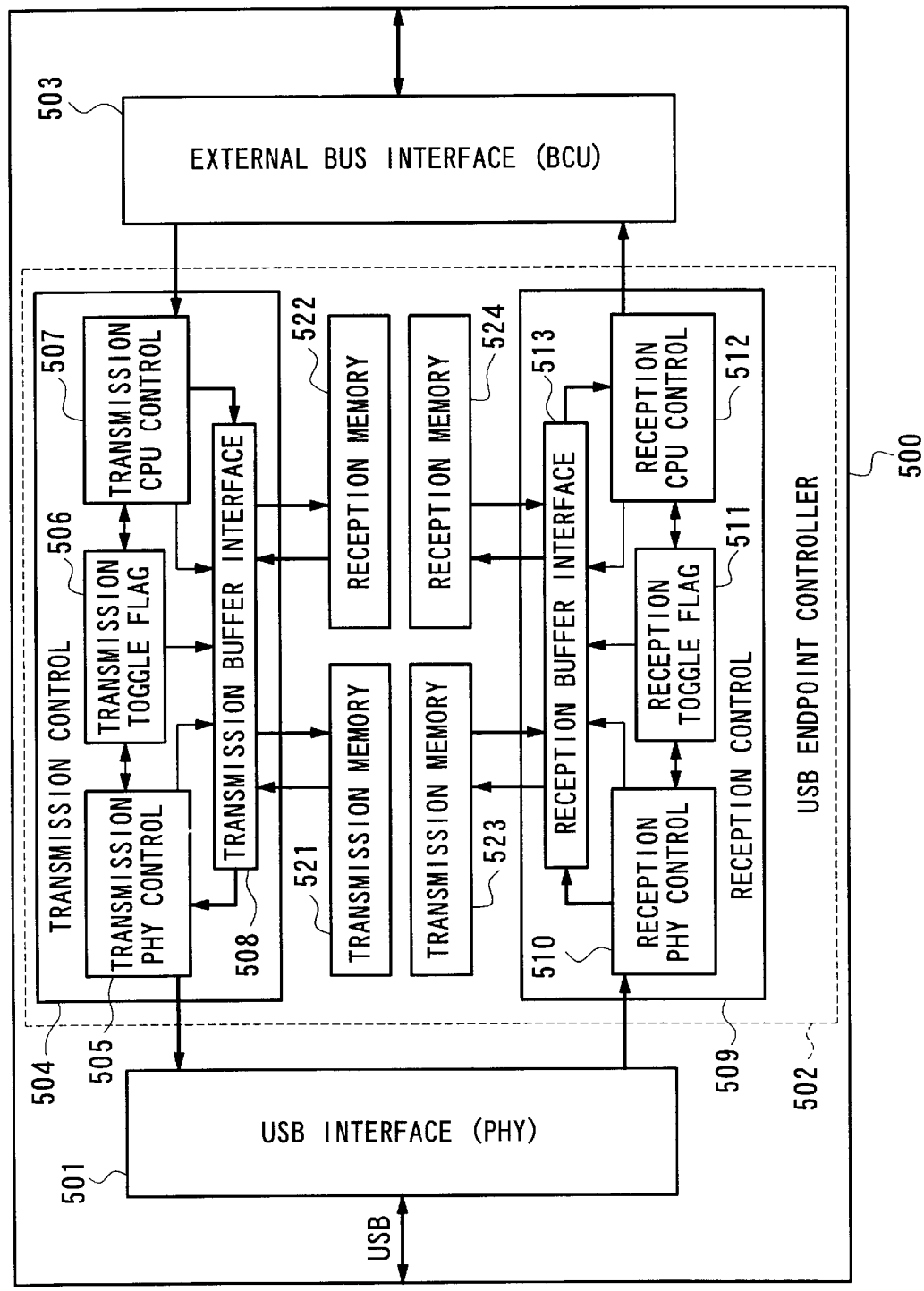
FIG. 15 is a block diagram showing an example of the conventional USB device controller having double buffer configurations.
Figure 16:
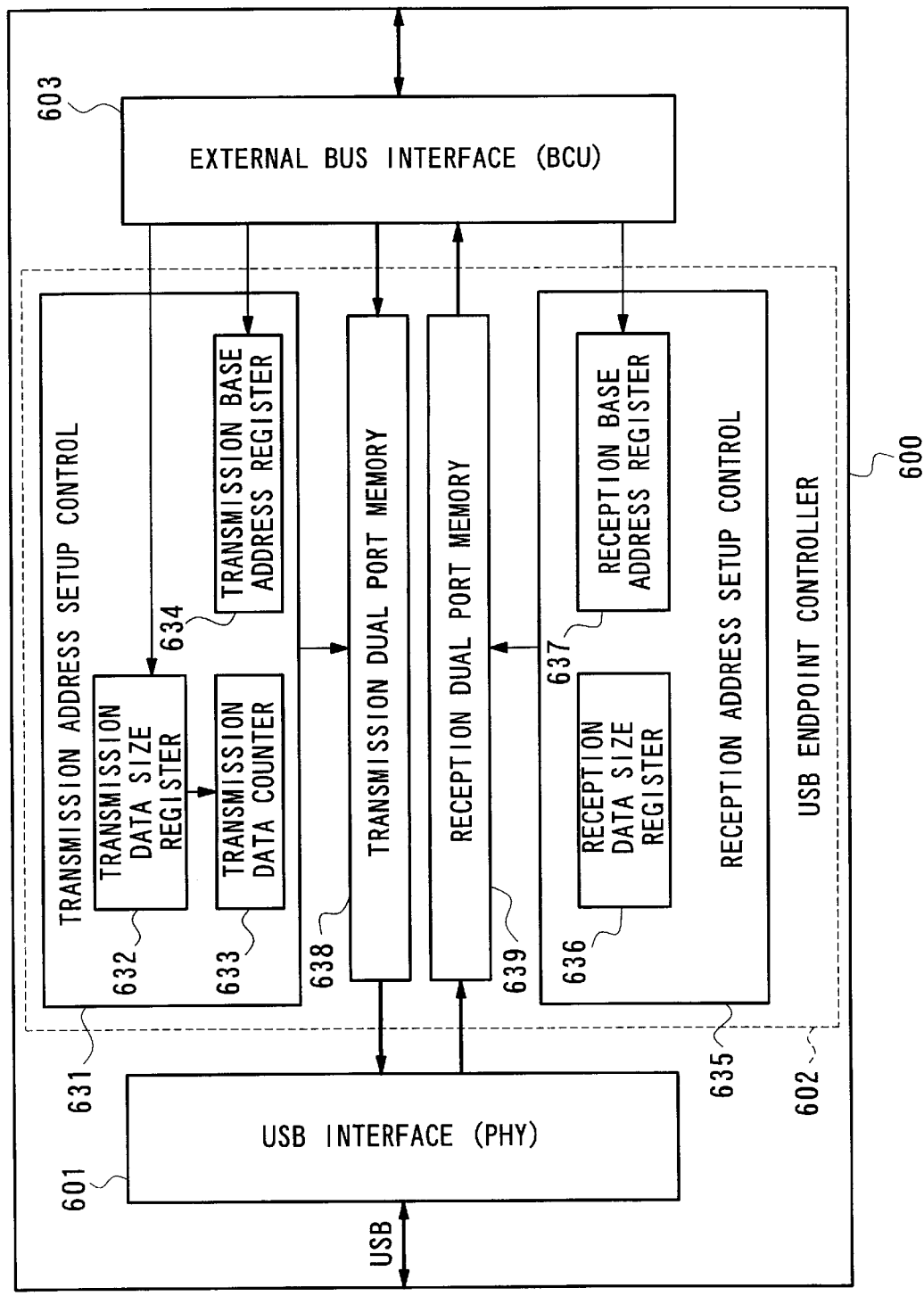
FIG. 16 is a block diagram showing an example of the conventional USB device controller using dual port memories.

As described before, the USB device controller 500 of FIG. 15 actualizes the double buffer configurations with respect to the transmission endpoint and reception endpoint respectively. For this reason, two memories are provided for the transmission endpoint, and two memories are also provided for the reception endpoint.

The reception data are configured by plural OUT transaction data, so that the USB device controller must frequently perform consecutive reception processes during the data reception mode. In other words, it is satisfactory that only the reception endpoint actualizes the double buffer configuration during the data reception mode, so there is no need to simultaneously actualize the double buffer configuration for the transmission endpoint as well.

The transmission data are configured by plural IN transaction data, so that the USB device controller must frequently perform consecutive transmission processes during the data transmission mode. In other words, it is satisfactory that only the transmission endpoint actualizes the double buffer configuration during the data transmission mode, so there is no need to simultaneously actualize the double buffer configuration for the reception endpoint as well.

Figure 6A:
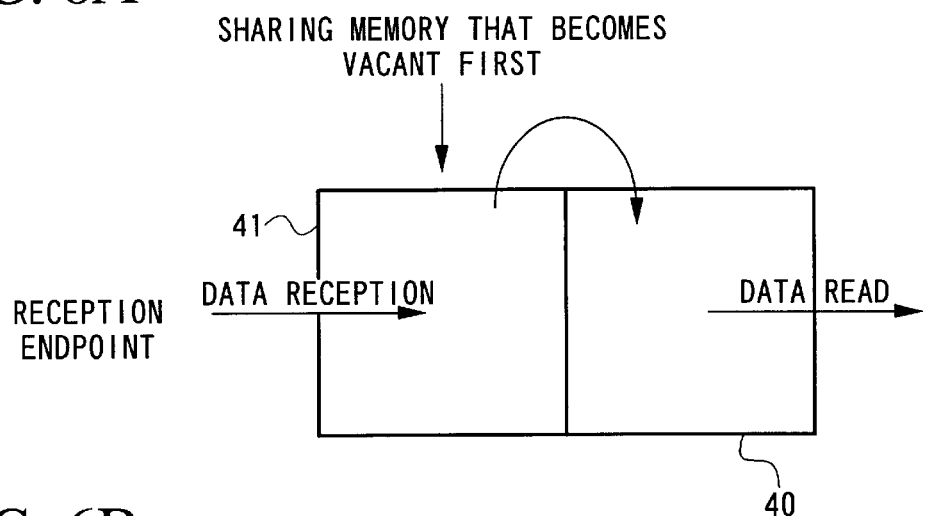
FIG. 6A diagrammatically shows a combination of a reception-specified buffer and a common buffer for use in the reception endpoint.
Figure 6B:
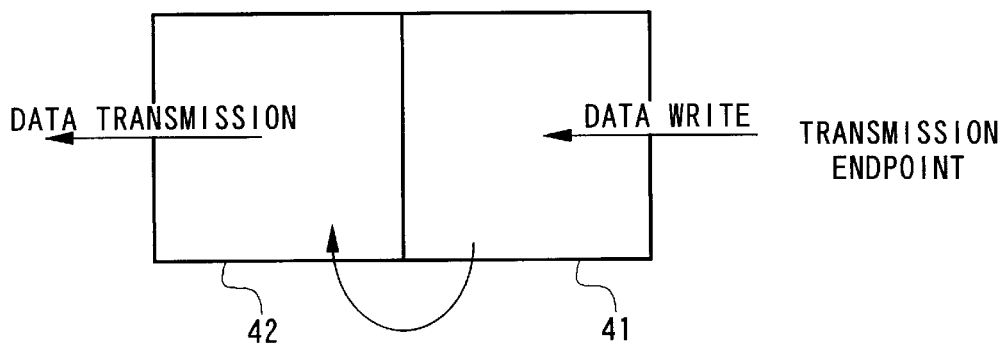
FIG. 6B diagrammatically shows a combination of a transmission-specified buffer and the common buffer fur use in the transmission endpoint.

As shown in FIG. 2, the USB endpoint controller 102 has three memories 115, 116 and 117, which are assigned as a reception-specified buffer 40, a common buffer 41 and a transmission-specified buffer 42 (see FIGS. 6A and 6B). By alternately switching over the function of the common buffer 41 between the transmission buffer and reception buffer in accordance with the prescribed conditions, the reception endpoint actualizes the double buffer configuration using the reception-specified buffer 40 and the common buffer 41 during the reception mode, while the transmission endpoint actualizes the double buffer configuration using the transmission-specified buffer 42 and the common buffer 41 during the transmission mode. Incidentally, the UBS device controller sets the transfer mode thereof to one of two states corresponding to the reception mode in which the reception endpoint actualizes the double buffer configuration and the transmission mode in which the transmission endpoint actualizes the double buffer configuration.

The buffer switch control block 114 switches over the transfer mode between the two states, so that the state of the transfer mode is communicated to the transmission control block 104 and the reception control block 109 respectively. Based on the transfer mode, each of the transmission control block 104 and the reception control block 109 makes a determination whether to actualize the double buffer configuration or single buffer configuration.

FIG. 7 shows a first mode switch process by which the USB endpoint controller 102 switches over functions thereof from the reception mode to the transmission mode.

At 'START' of the flow of FIG. 7, the transfer mode of the USB endpoint controller 102 is originally set to the reception mode. In first step S11, a decision is made as to whether an OUT token is detected or not. If the OUT token is detected, the flow proceeds to step S12 in which data reception controls are performed on the reception endpoint that continuously actualizes the double buffer configuration during the reception mode. Then, the USB endpoint controller 102 ends the first mode switch process of FIG. 7.

If the OUT token is not detected in step S11, the flow proceeds to step S13 in which a decision is made as to whether an IN token is detected or not. If the IN token is detected, the flow proceeds to step S14 in which a decision is made as to whether the reception PHY buffer is vacant or not. If vacant, the flow proceeds to step S15 in which the transfer mode is switched to the transmission mode. In step S16, data transmission controls are performed on the transmission endpoint that actualizes the double buffer configuration. Then, the USB endpoint controller 102 ends the first mode switch process of FIG. 7.

If it is determined that the reception PHY buffer is not vacant, the flow proceeds to step S17 in which data transmission controls are performed on the transmission endpoint that remains in the single buffer configuration. Then, the USB endpoint controller 102 ends the first mode switch process of FIG. 7.

If the IN token is not detected in step S13, the USB endpoint controller 102 immediately ends the first mode switch process.

The aforementioned first mode process is designed such that after completion of the step S14 for determining whether the reception PHY buffer (that is used to write data) becomes vacant, the transfer mode is switched to the transmission mode in the step S15. It is possible to modify the first mode switch process such that the transfer mode is switched to the transmission mode if the reception PHY buffer (that is used to write data) or the reception CPU buffer (that is used to read data) becomes vacant. In that case, the 'vacant' buffer is used as the common buffer, by which the transmission endpoint actualizes the double buffer configuration.

Figure 8:
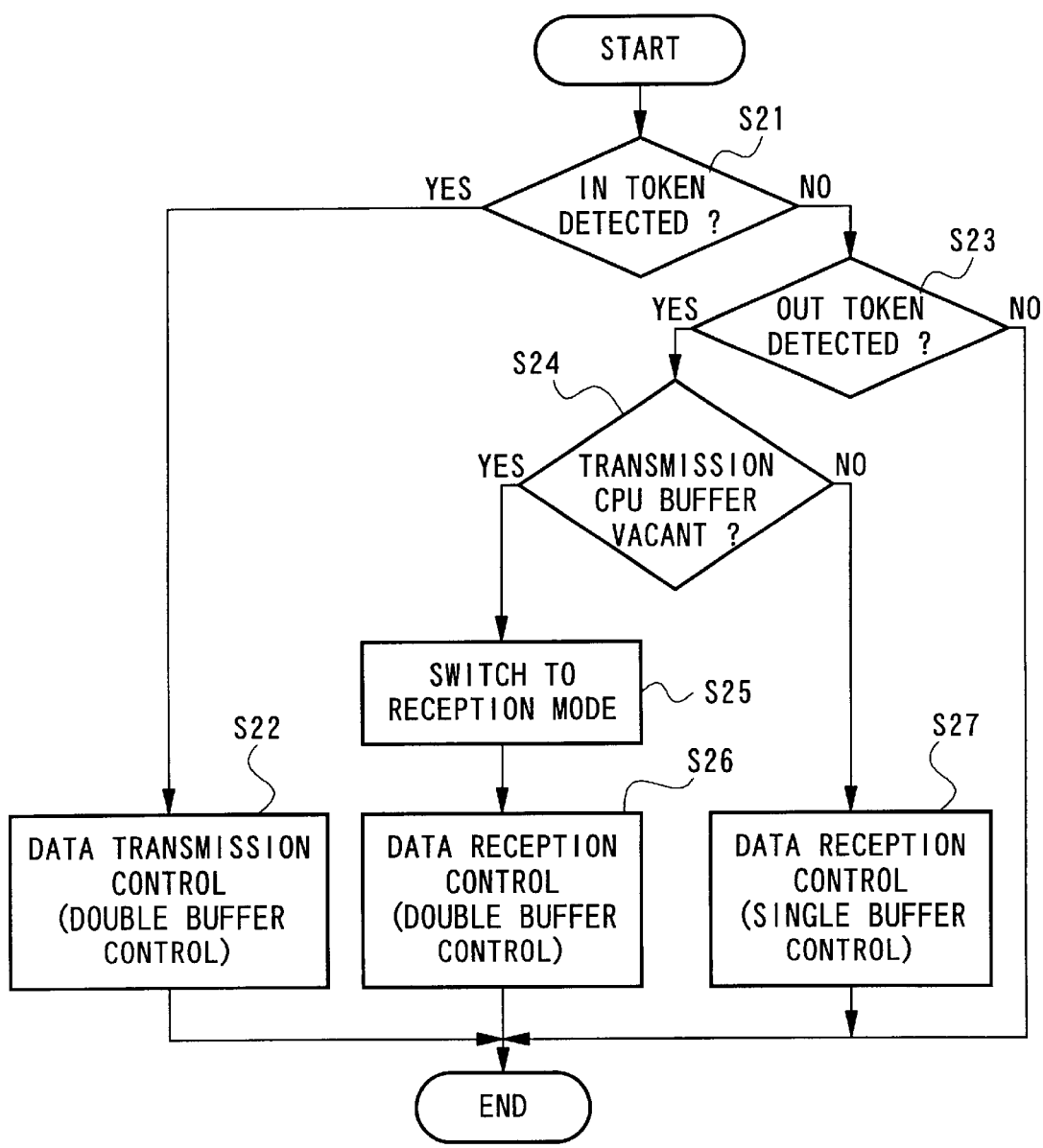
FIG. 8 is a flowchart showing a second mode switch process by which the transfer mode of the USB endpoint controller is switched from the transmission mode to the reception mode.

FIG. 8 shows a second mode switch process by which the transfer mode of the USB endpoint controller 102 is switched from the transmission mode to the reception mode.

At 'START' of the flow of FIG. 8, the transfer mode of the USB endpoint controller 102 is originally set to the transmission mode. In first step S21, a decision is made as to whether an IN token is detected or not. If the IN token is detected, the flow proceeds to step S22 in which data transmission controls are performed on the transmission endpoint that continuously actualizes the double buffer configuration during the transmission mode. Then, the USB endpoint controller 102 ends the second mode switch process of FIG. 8.

If the IN token is not detected, the flow proceeds to step S23 in which a decision is made as to whether an OUT token is detected or not. If the OUT token is detected, the flow proceeds to step S24 in which a decision is made as to whether the transmission CPU buffer becomes vacant or not. If vacant, the flow proceeds to step S25 in which the transmission mode is switched to the reception mode. In step S26, data reception controls are performed on the reception endpoint that actualizes the double buffer configuration. Then, the USB endpoint controller 102 ends the second mode switch process of FIG. 8.

If it is determined in step S24 that the transmission CPU buffer is not vacant, the flow proceeds to step S27 in which data transmission controls are performed on the transmission endpoint that remains in the single buffer configuration. Then, the USB endpoint controller 102 ends the second mode switch process of FIG. 8.

If the OUT token is not detected in step S23, the USB endpoint controller 102 immediately ends the second mode switch process of FIG. 8.

The aforementioned second mode switch process is designed such that after completion of the step 24 for determining whether the transmission CPU buffer (that is used to write data) becomes vacant, the transfer mode is switched to the reception mode in the step S25. It is possible to modify the second mode switch process such that the transfer mode is switched to the reception mode if the transmission CPU buffer (that is used to write data) or the transmission PHY buffer (that is used to read data) becomes vacant. In that case, the 'vacant' buffer is used as the common buffer, by which the reception endpoint actualizes the double buffer configuration.

According to the know standard of "Universal Serial Bus Mass Storage Class Bulk Only Transport Rev. 1.0", USB transfer processes are specialized in the specific applications so that transfer modes are determined in advance. In that case, it is unnecessary to perform the aforementioned mode switch processes of FIGS. 7 and 8. Instead of these processes, it is possible to install a register setup process by which the transfer mode is fixedly set to the transmission mode or reception mode. In this case, it is possible to fix assignment of functions (representing the transmission-specified buffer, reception-specified buffer and common buffer) to the memories 115, 116 and 117.

Figure 9:
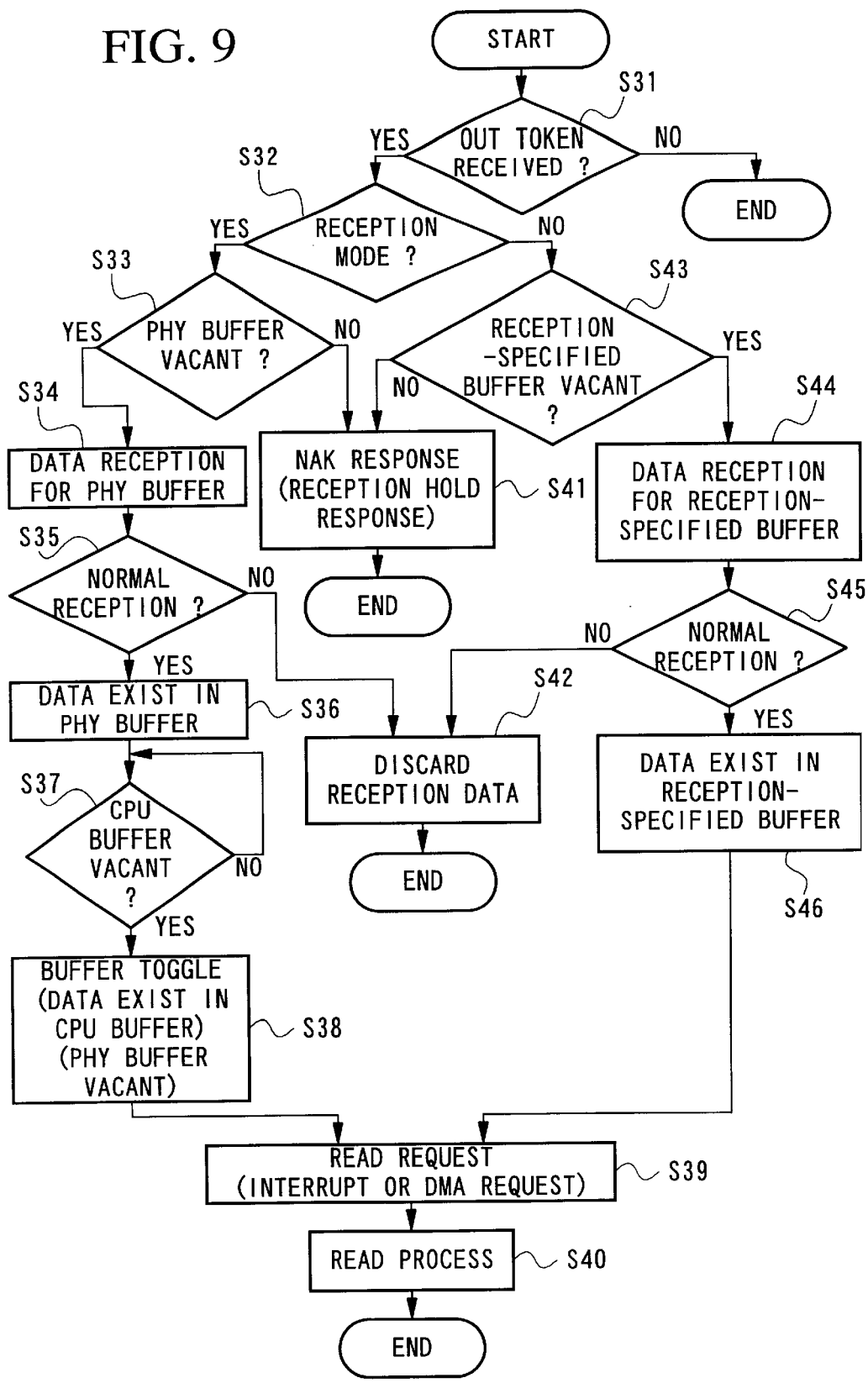
FIG. 9 is a flowchart showing a data reception control process executed by a reception control block of the USB endpoint controller.

FIG. 9 shows a data reception control process for the USB endpoint controller 102. Actually, this process is executed by the reception control block 109 shown in FIG. 2.

First, the flow proceeds to step S31 in which a decision is made as to whether an OUT token is received or not. If the USB endpoint controller 102 receives an OUT token, the flow proceeds to step S32 in which a decision is made as to whether the transfer mode is presently set to the reception mode or not.

If the transfer mode is set to the reception mode, the reception control block 109 performs a data reception process on the reception endpoint actualizing the double buffer configuration. That is, the flow proceeds to step S33 in which a decision is made as to whether the PHY buffer is vacant or not. If the PHY buffer is vacant, the flow proceeds to step S34 in which the USB endpoint controller 102 uses the PHY buffer to receive the data packet that is sent thereto subsequently to the token packet. The data packet is stored in the PHY buffer.

In step S35, a decision is made as to whether data reception is normally completed or not. After completion of the normal data reception, the flow proceeds to step S36 in which the USB endpoint controller 102 sustains the data being still held by the PHY buffer. The reception control block 109 waits for an event in which the CPU buffer becomes vacant (see step S37), and then it changes the state of the reception toggle flag. In step S39, the reception control block 109 issues an interrupt to the CPU of the peripheral device 2, or it issues a data read request to the DMA controller of the peripheral device 2. In step S40, the reception control block 109 uses the CPU buffer to perform data read operations on the peripheral device 2. Then, it ends the data reception control process of FIG. 9.

If the reception control block 109 determines in step S35 that the data reception is not normally completed on the PHY buffer, the flow proceeds to step S42 in which the reception control block 109 discards the reception data. Then, it ends the data reception control process of FIG. 9.

If the reception control block 109 determines in step S33 that the PHY buffer is not vacant, the flow proceeds to step S41 in which the reception control block 109 sends a handshake packet indicating 'NAK' (i.e., negative acknowledge) to the host 1, so that the USB endpoint controller 102 is placed under the reception hold state, and then the reception control block 109 ends the data reception control process of FIG. 9. Thus, the USB endpoint controller 102 holds the data reception until the PHY buffer becomes vacant.

If the reception control block 109 determines in step S32 that the transfer mode is set to the transmission mode, it invalidates the reception toggle flag so that a data reception process is performed using a single buffer configuration. That is, the flow proceeds to step S43 in which a decision is made as to whether the reception-specified buffer becomes vacant or not. If the reception-specified buffer is vacant, the flow proceeds to step S44 in which the data packet is received and is stored in the reception-specified buffer. In step S45, a decision is made as to whether the data reception is normally completed or not. After completion of the normal data reception, the flow proceeds to step S46 in which the reception control block 109 sustains the data being still held by the reception-specified buffer. Thereafter, the flow proceeds to step S39.

If the reception control block 109 determines in step S45 that the normal data reception is not performed on the reception-specified buffer, the flow proceeds to step S42.

If the reception control block 109 determines in step S43 that the reception-specified buffer is not vacant, the flow proceeds to step S41 in which the reception control block 109 sends a handshake packet indicating 'NAK' to the host 1, so that the USB endpoint controller 102 is placed under the reception hold state, and then the reception control block 109 ends the data reception control process of FIG. 9. Thus, the USB endpoint controller 102 holds the data reception until the reception-specified buffer becomes vacant.

If the reception control block 109 determines in step S31 that the OUT token is not received, it immediately ends the data reception control process of FIG. 9.

Incidentally, the isochronous transfer that is used for the real-time transfer does not define the handshake packets, so it is impossible to provide 'NAK' response to the host. In that case, it is necessary to modify the data reception control process such that discarding the reception data is performed instead of the step S41, and then the process is ended.

Figure 10:
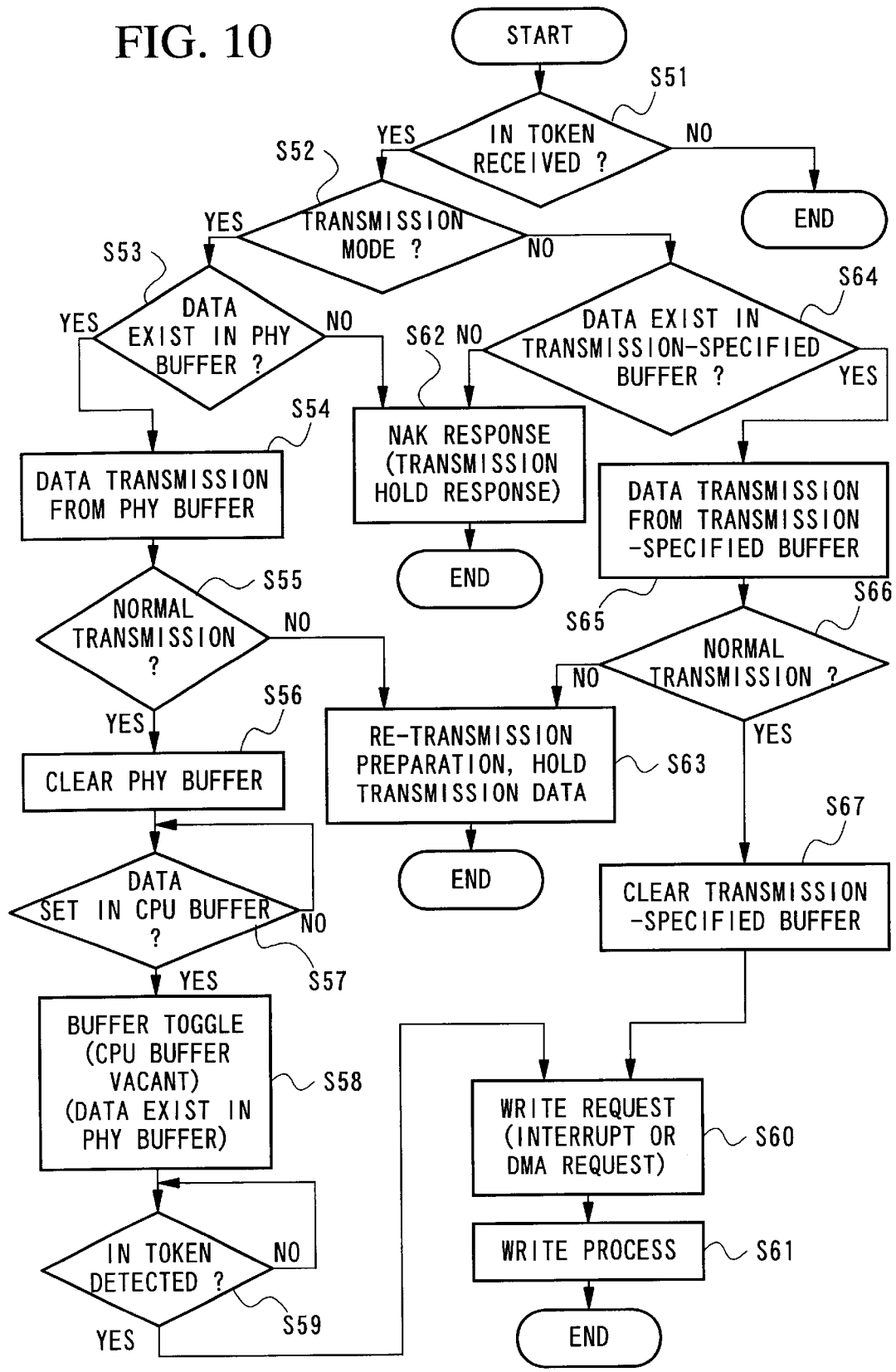
FIG. 10 is a flowchart showing a data transmission control process executed by a transmission control block of the USB endpoint controller.

FIG. 10 shows a data transmission control process for the USB endpoint controller 102. Actually, this process is executed by the transmission control block 104.

First, the flow proceeds to step S51 in which a decision is made as to whether an IN token is received or not. Upon reception of the IN token, the flow proceeds to step S52 in which a decision is made as to whether the transfer mode of the USB endpoint controller 102 is set to the transmission mode or not.

During the transmission mode, a data transmission process is performed on the transmission endpoint actualizing the double buffer configuration. That is, the flow proceeds to step S53 in which a decision is made as to whether some data exist in the PHY buffer or not. If "YES", transmission endpoint transmits data packets from the PHY buffer in step S54.

In step S55, a decision is made as to whether data transmission is completed normally or not. After completion of the normal data transmission, the flow proceeds to step S56 in which the PHY buffer is cleared to establish a non-data state. Due to step S57, the transmission control block 104 waits for an event in which data are set to the CPU buffer. If the data are set to the CPU buffer, the flow proceeds to step S58 in which the transmission control block 104 changes the state of the transmission toggle flag. Due to step S59, the transmission control block 104 waits for detection of the IN token. In step S60, the USB endpoint controller 102 issues an interrupt to the CPU of the peripheral device 2, or it issues a data write request to the DMA controller of the peripheral device 2. In step S61, the USB endpoint controller 102 writes data from the peripheral device 2 to the CPU buffer. Thereafter, the transmission control block 104 ends the data transmission control process of FIG. 10.

If the transmission control block 104 determines in step S55 that the data transmission is not completed normally, the flow proceeds to step S63 in which it holds the transmission for a while to make a preparation for retransmission. Then, it ends the data transmission control process of FIG. 10.

If the transmission control block 104 determines in step S53 that no data exists in the PHY buffer, the flow proceeds to step S62 in which it sends to the host 1, a handshake packet indicating 'NAK' (representing a transmission hold message) instead of the data packet. Thus, the transmission control block 104 establishes a transmission hold state for the transmission endpoint. Then, it ends the data transmission control process of FIG. 10. As a result, the USB endpoint controller 102 holds (or temporarily stops) the data transmission until data are written to the PHY buffer.

If the transmission control block 104 determines in step S52 that the transfer mode is presently set to the reception mode, it invalidates the transmission toggle flag so that a data transmission process is performed on the transmission endpoint actualizing a single buffer configuration. That is, the flow proceeds to step S64 in which some data exist in the transmission-specified buffer or not. If the transmission-specified buffer stores the data, the flow proceeds to step S65 in which the USB endpoint controller 102 transmits data packets from the transmission-specified buffer. In step S66, a decision is made as to whether the data transmission is completed normally or not. After completion of the normal data transmission, the flow proceeds to step S67 in which the transmission-specified buffer is cleared. Thereafter, the flow proceeds to step S60.

If the transmission control block 104 determines in step S66 that the data transmission is not completed normally, the flow proceeds to step S63.

If the transmission control block 104 determines in step S64 that no data exists in the transmission-specified buffer, the flow proceeds to step S62 in which the USB endpoint controller 102 transmits to the host 1, a handshake packet indicating 'NAK' (representing a transmission hold state) instead of the data packet. Thus, it establishes a transmission hold state, and then the transmission control block 104 ends the data transmission control process of FIG. 10. Thereafter, the USB endpoint controller 102 holds (or temporarily stops) the data transmission until data are written to the transmission-specified buffer.

If the transmission control block 104 does not detect the IN token in step S51, it immediately ends the data transmission control process of FIG. 10.

Incidentally, the isochronous transfer that is used for the real-time transfer does not define the handshake packets, so it is impossible to make a NAK response using the handshake packet. In that case, the USB endpoint controller proceeds to transmission of a data packet whose length is zero byte, which substitutes for the step S62 in FIG. 10.

The reason why the USB endpoint controller makes a data write request in step S60 upon detection of an IN token (see step S59) is to ensure transmission of the transmission data stored in the PHY buffer in response to reception of the IN token. This avoids an unwanted state in which the transfer mode cannot be switched to the reception mode because the transmission data occupies both of the double buffers to prevent reception of the IN token. Thus, it is possible to ensure 'smooth' transition to the reception mode. If the USB transfer is specialized in the specific applications so that the transfer mode is fixedly selected between the transmission mode and reception mode by means of the register, it is possible to exclude the step S59 from the data transmission control process of FIG. 10.

According to the present embodiment described above, the USB endpoint controller 102 adequately changes over assignments of the common buffer 41 such that the common buffer 41 is assigned to the reception endpoint in the reception mode while it is assigned to the transmission endpoint in the transmission mode. Thus, it is possible to reduce the total number of memories that are used for actualizing the double buffer configuration for the reception endpoint and transmission endpoint respectively.

In addition, the present embodiment is designed such that the data transmission is performed using the transmission endpoint actualizing the double buffer configuration during the transmission mode while the data reception is performed using the reception endpoint actualizing the double buffer configuration during the reception mode. Therefore, it is possible to perform high-speed processing with respect to the transmission and reception of the data that are normally configured by plural transaction data. Thus, the USB endpoint controller 102 that has the reduced number of memories as compared with the conventional one is capable of realizing the satisfactory communications performance that is substantially equal to the conventional USB endpoint controller 502 whose circuit scale is relatively large because of always actualization of the double buffer configurations for the transmission endpoint and reception endpoint respectively.

Figure 17:
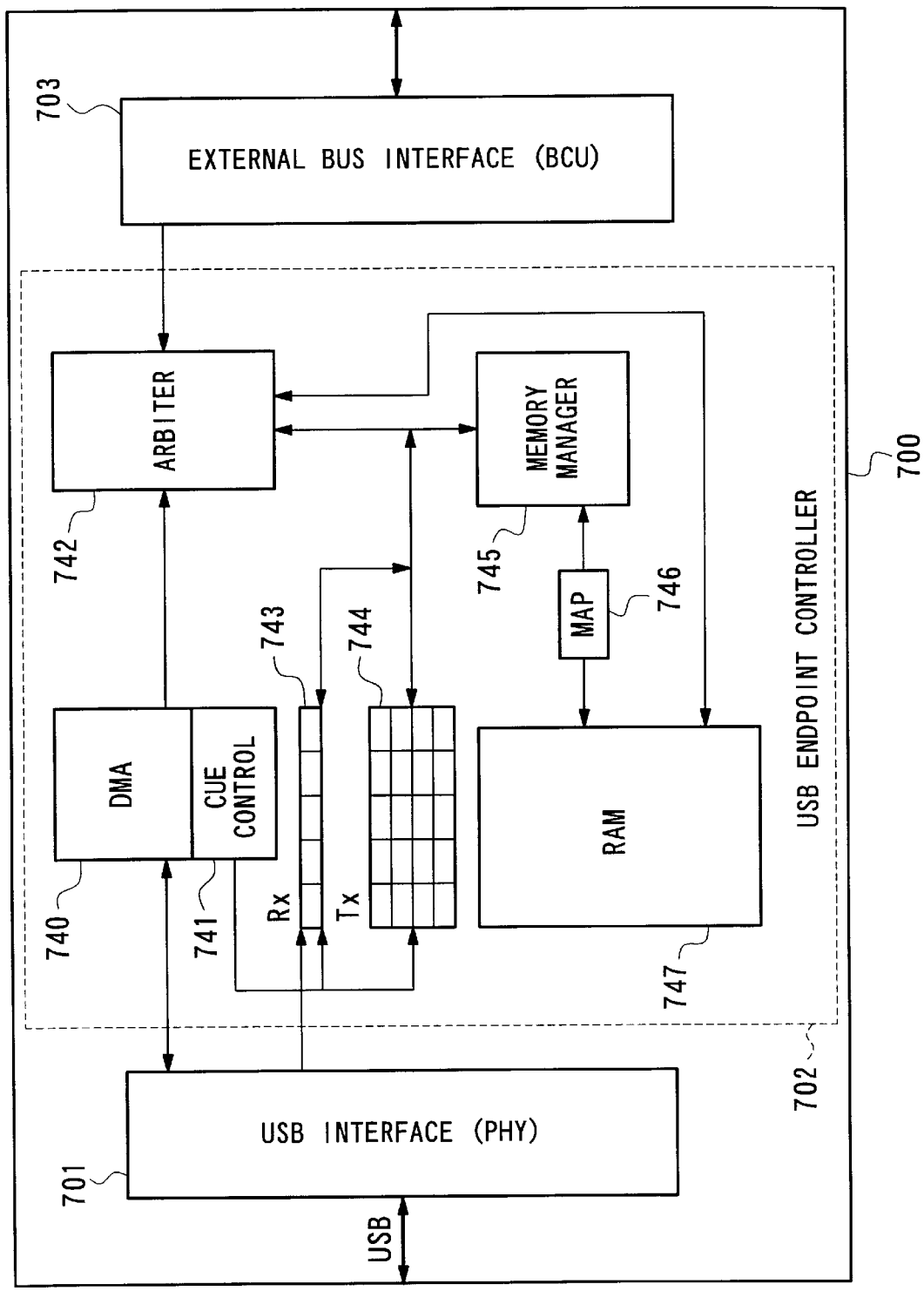
FIG. 17 is a block diagram showing an example of the conventional USB device controller that dynamically allocates areas of the memory space to packets.

Further, the present embodiment is designed such that data transmission is performed using the transmission endpoint actualizing a single buffer configuration during the reception mode while data reception is performed using the reception endpoint actualizing a single buffer configuration during the transmission mode. This allows the USB interface, the data transfer timing of which is managed by the host, to respond to requests from the host at all time. In other words, it is possible to avoid occurrence of inconvenient states in which the USB interface becomes unavailable in transmission and reception of data. That is, the present embodiment does not cause the problem that may occur in the conventional USB device controller 700 shown in FIG. 17 and in which the USB interface cannot accept data even when an OUT token is detected because the memories are occupied with the transmission data.

[B] Second Embodiment

Next, a USB device controller of a second embodiment will be described with reference to FIG. 11. This USB device controller contains a USB endpoint controller that provides two transmission control blocks for actualization of double buffer configurations by sharing memories.

Figure 11:
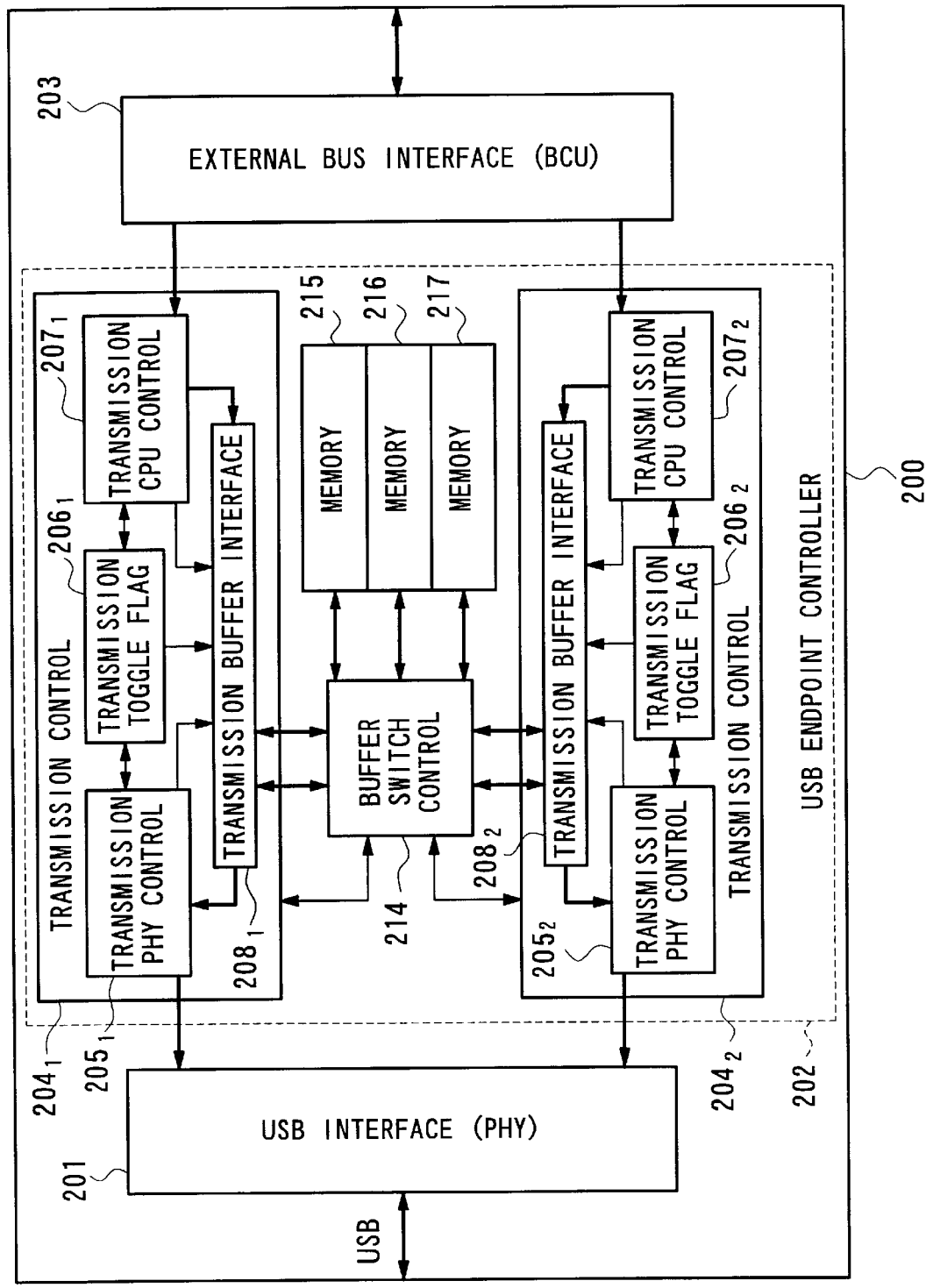
FIG. 11 is a block diagram showing a configuration of a USB device controller in accordance with a second embodiment of the invention.

With reference to FIG. 11, a USB device controller 200 is basically configured by a USB interface 201, a USB endpoint controller 202 and an external bus interface 203.

The USB endpoint controller 202 contains transmission control blocks $204_1$, $204_2$, a buffer switch control block 214, and memories 215, 216 and 217. FIG. 11 shows outstanding features of the second embodiment in which two transmission control blocks $204_1$ and $204_2$ are provided inside of the USB endpoint controller 202. Herein, the first transmission control block $204_1$ controls a first endpoint, while the second transmission control block $204_2$ controls a second endpoint.

The USB endpoint controller 202 actualizes the double buffer configuration for either the first endpoint or the second endpoint. The double buffer configuration consists of two memories, wherein transmission data are written to one memory (i.e., CPU buffer) while transmission data are simultaneously read from another memory (i.e., PHY buffer).

Due to the provision of the two endpoints, there are provided a first transmission mode in which the first endpoint actualizes the double buffer configuration and a second transmission mode in which the second endpoint actualizes the double buffer configuration. Hence, the USB endpoint controller 202 is capable of selecting either the first transmission mode or the second transmission mode.

Figure 12:
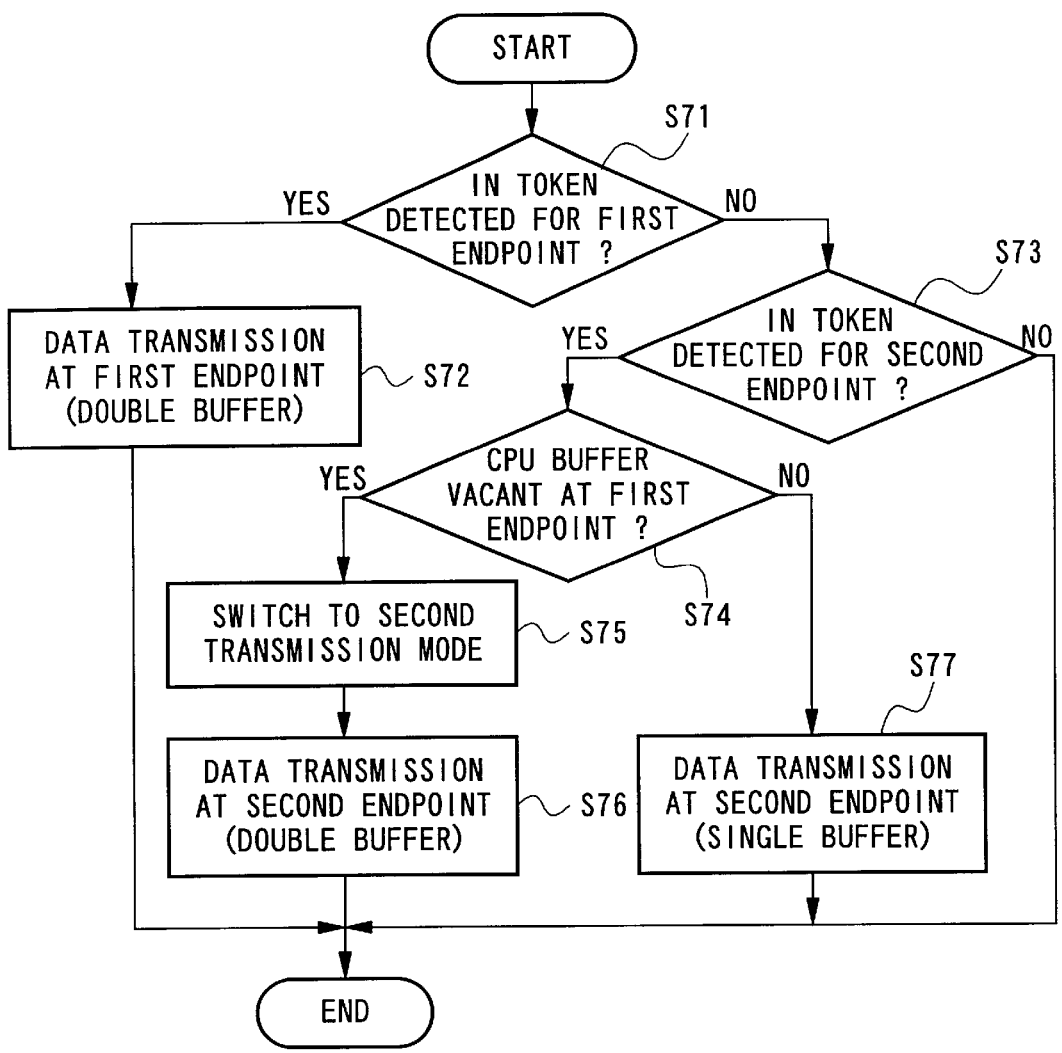
FIG. 12 is a flowchart showing a data transmission control process in which a first transmission mode is switched to a second transmission mode by a USB endpoint controller of the USB device controller shown in FIG. 11.

FIG. 12 shows a data transmission control process in which the first transmission mode is adequately switched to the second transmission mode under the control of the USB endpoint controller 202. In first step S71, a decision is made as to whether an IN token for the first endpoint is detected or not. If the USB endpoint controller 202 detects the IN token for the first endpoint, the flow proceeds to step S72 in which the first transmission control block $204_1$ performs data transmission controls on the first endpoint that still actualizes the double buffer configuration during the first transmission mode. Then, the USB endpoint controller 202 ends the data transmission control process of FIG. 12.

If the USB endpoint controller 202 fails to detect an IN token for the first endpoint in step S71, the flow proceeds to step S73 in which a decision is made as to whether an IN token for the second endpoint is detected or not. If the IN token for the second endpoint is detected, the flow proceeds to step S74 in which a decision is made as to whether the CPU buffer of the first endpoint becomes vacant or not. If vacant, the flow proceeds to step S75 in which the first transmission mode is switched to the second transmission mode. In step S76, the second transmission control block $204_2$ performs data transmission controls on the second endpoint that actualizes the double buffer configuration. Then, the USB endpoint controller 202 ends the data transmission control process of FIG. 12.

If the USB endpoint controller 202 determines in step S74 that the CPU buffer of the first endpoint is not vacant, the flow proceeds to step S77 in which the second transmission control block $204_2$ performs data transmission controls on the second endpoint that actualizes a single buffer configuration because the first transmission mode is sustained. Then, the USB endpoint controller 202 ends the data transmission control process of FIG. 12.

If the USB endpoint controller 202 determines in step S74 that the CPU buffer of the first endpoint does not become vacant, the flow proceeds to step S77 in which the second transmission control block $204_2$ performs data transmission controls on the second endpoint that actualizes a single buffer configuration because the first transmission mode is sustained. Then, the USB endpoint controller 202 ends the data transmission control process of FIG. 12.

If the USB endpoint controller 202 fails to detect an IN token for the second endpoint in step S73, it immediately ends the data transmission control process of FIG. 12.

As described above, the USB device controller of the second embodiment provides the USB endpoint controller containing two transmission control blocks that alternately actualize the double buffer configuration for two endpoints by sharing the memories.

As similar to the foregoing USB endpoint controller 102 employed in the first embodiment shown in FIG. 2, the USB endpoint controller 202 shown in FIG. 11 reduces the total number of memories, which are adequately used for actualization of the double buffer configuration in either the first endpoint or the second endpoint.

In addition, the second embodiment ensures high-speed processing in data transfer processes by alternately actualizing the double buffer configuration for the first endpoint during the first transmission mode or the second endpoint during the second transmission mode.

Further, the first endpoint actualizes a single buffer configuration during the second transmission mode while the second endpoint actualizes a single buffer configuration during the first transmission mode. Thus, the USB device controller of the second embodiment can always respond to requests of data transmission and reception, which are arbitrarily issued by the host 1, during execution of the data transfer processes that are executed by the USB interface, data transmission and reception timing of which is managed by the host 1.

[C] Third Embodiment

Figure 13:
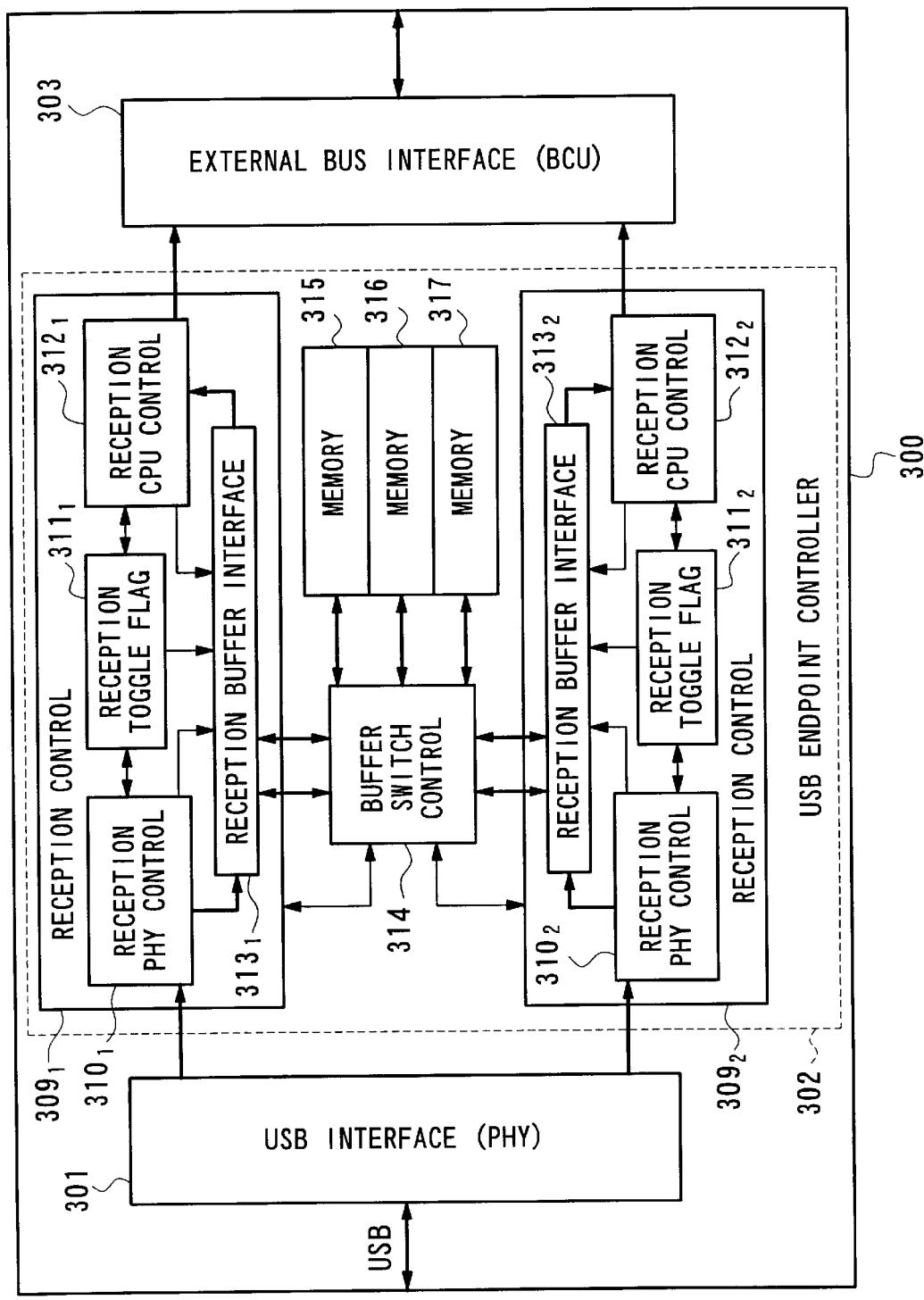
FIG. 13 is a block diagram showing a configuration of a USB device controller in accordance with a third embodiment of the invention.

Next, a USB device controller of a third embodiment will be described with reference to FIG. 13. That is, a USB device controller 300 of the third embodiment is basically configured by a USB interface 301, a USB endpoint controller 302 and an external bus interface 303.

The USB endpoint controller 302 contains reception control blocks $309_1$, $309_2$, a buffer switch control block 314, and memories 315, 316 and 317. FIG. 13 shows the outstanding features of the third embodiment in which two reception control blocks $309_1$, $309_2$ are provided inside of the USB endpoint controller 302. Herein, the first reception control block $309_1$ controls a first endpoint while the second reception control block $309_2$ controls a second endpoint.

The USB endpoint controller 302 can actualize the double buffer configuration for either the first endpoint or the second endpoint.

In addition, the USB endpoint controller 302 is capable of selecting either a first reception mode in which the first endpoint actualizes the double buffer configuration and a second reception mode in which the second endpoint actualizes the double buffer configuration.

Figure 14:
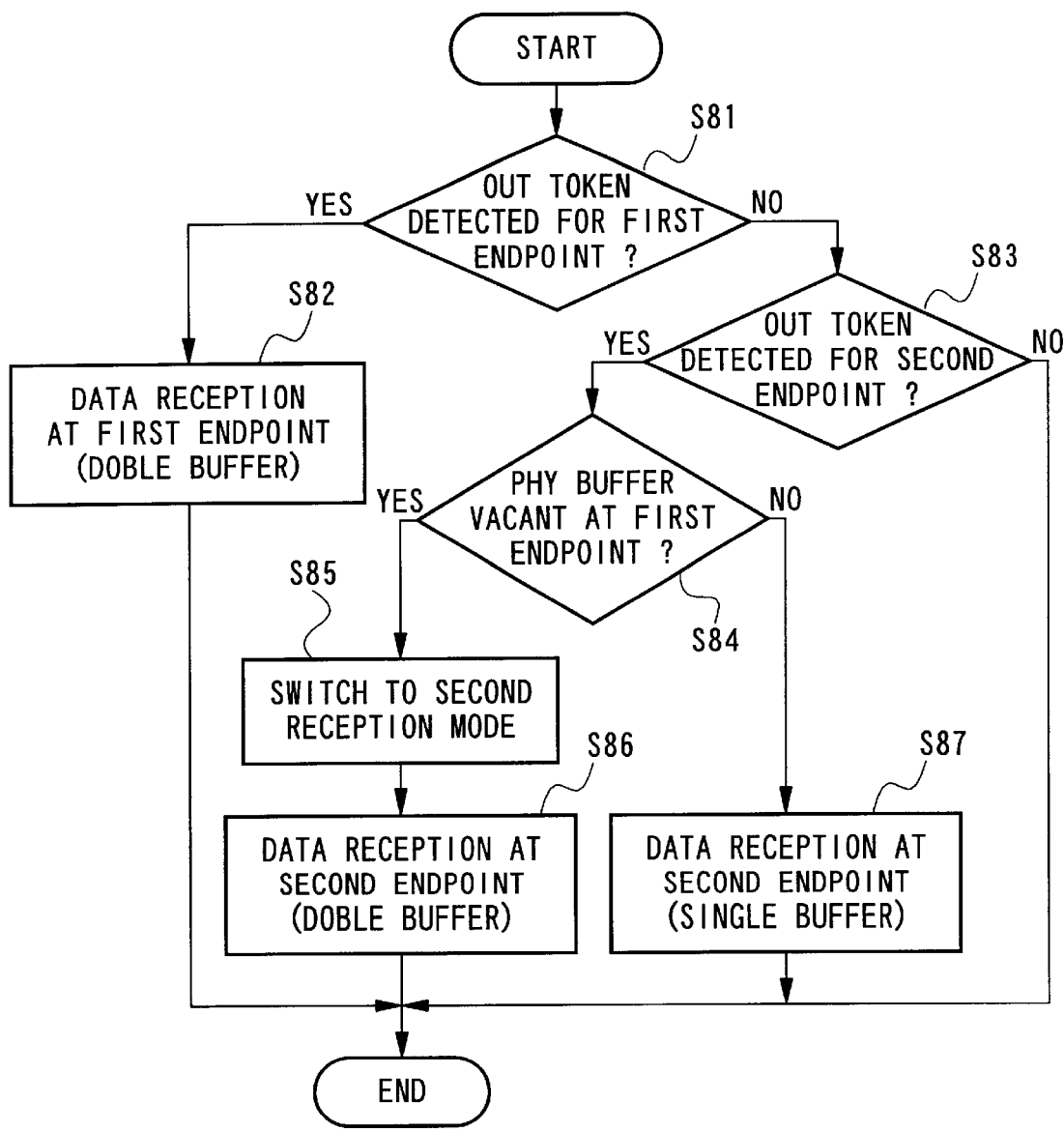
FIG. 14 is a flowchart showing a data transmission control process in which a first reception mode is switched to a second reception mode by a USB endpoint controller of the USB device controller shown in FIG. 13.

FIG. 14 shows a data reception control process in which the first reception mode is adequately switched to the second reception mode under the control of the USB endpoint controller 302. In first step S81, a decision is made as to whether an OUT token for the first endpoint is detected or not. If the OUT token is detected, the flow proceeds to step S82 in which data reception controls are performed on the first endpoint that actualizes the double buffer configuration because the USB endpoint controller 302 sustains the first reception mode. Then, the USB endpoint controller 302 ends the data reception control process of FIG. 14.

If the USB endpoint controller 302 fails to detect an OUT token for the first endpoint in step S81, the flow proceeds to step S83 in which a decision is made as to whether an OUT token for the second endpoint is detected or not. If the OUT token for the second endpoint is detected, the flow proceeds to step S84 in which the PHY buffer of the first endpoint becomes vacant or not. If vacant, the flow proceeds to step S85 in which the first reception mode is switched to the second reception mode. In step S86, data reception controls are performed on the second endpoint that actualizes the double buffer configuration because of the second reception mode. Then, the USB endpoint controller 302 ends the data reception control process of FIG. 14.

If the USB endpoint controller 302 determines in step S84 that the PHY buffer of the first endpoint is not vacant, the flow proceeds to step S87 in which data reception controls are performed on the second endpoint that actualizes a single buffer configuration because the USB endpoint controller 302 still sustains the first reception mode. Then, the USB endpoint controller 302 ends the data reception control process of FIG. 14.

If the USB endpoint controller 302 determines in step S83 that the OUT token for the second endpoint is not detected, it immediately ends the data reception control process of FIG. 14.

As similar to the foregoing USB endpoint controller 102 of the first embodiment shown in FIG. 2, the USB endpoint controller 302 of the third embodiment can reduce the total number of memories for actualization of the double buffer configuration for either the first endpoint or the second endpoint.

In addition, the third embodiment is designed such that the double buffer configuration is actualized by the first endpoint during the first reception mode and is also actualized by the second endpoint during the second reception mode. Because of the actualization of the double buffer configuration, it is possible to perform high-speed processing in the data reception processes.

Further, the third embodiment is designed such that the single buffer configuration is actualized by the first endpoint during the second reception mode and is also actualized by the second endpoint during the first reception mode. Due to the actualization of the single buffer configuration in the first or second endpoint that is free from the data reception process, it is possible to avoid occurrence of unavailable states in which the USB device controller cannot receive the data.

As described heretofore, the aforementioned embodiments are characterized by sharing the memories between two endpoints for use in data transmission and reception. Of course, the number of the endpoints is not necessarily limited to two. Hence, it is possible to share the memories between three or more endpoints. Herein, each of the endpoints provides a single buffer being specified thereto, while at least one common buffer is provided to realize the sharing of the memories. Thus, it is possible to reduce the circuit scale of the USB device controller as a whole. As the number of the endpoints is increased more and more, it is possible to provide a higher effect in reduction of the circuit scale of the USB device controller.

Lastly, the present invention has a variety of technical features and effects, which will be described below.

(1) At least one buffer is commonly shared between the plural endpoints in actualization of the double buffer configuration. Therefore, it is possible to reduce the total number of memories that are adequately shared between the endpoints for actualization of the double buffer configuration. In addition, it is possible to perform high-speed processing in the data transmission and reception. Because the overall circuit scale of the USB device controller is reduced by reducing the number of the memories being shared between the endpoints, it is possible to downsize the USB device controller, and it is possible to decrease electric power being consumed by the USB device controller.

(2) The aforementioned effects of the present invention becomes noticeable as the buffer capacity becomes large or as the number of endpoints becomes large. Particularly, the present invention provides high contribution to industrialization of USB device controllers based on the new standard USB 2.0.

(3) For example, it is possible to propose a direct printer based on the standard USB 2.0 that installs a storage interface to realize USB data transfer, wherein as the bulk transfer endpoint of large capacity, there are provided three transmission endpoints and three reception endpoints, and wherein the maximal packet size is 512 bytes. To realize the aforementioned direct printer using the conventional USB device controller having the double buffer configurations, it is necessary to provide a total buffer capacity of 6144 (=512×2×6) bytes. To realize the aforementioned direct printer using the USB device controller of the present invention, it is necessary to provide a total buffer capacity of 4608 (512×3×3) bytes. Thus, as compared with the conventional USB device controller, the present invention can reduce the total buffer capacity by 1536 bytes.

(4) While one endpoint actualizes the double buffer configuration, another endpoint actualizes the single buffer configuration using its own buffer specified thereto. This makes every endpoint to be always available for the data transfer. Hence, The USB interface whose data transfer timing is managed by the host can always respond to the requests of data transmission and reception being issued from the host.

(5) Moreover, it is possible to adequately switch over the function of the common buffer between the transmission endpoint and reception endpoint for actualization of the double buffer configuration. Thus, it is possible to perform high-speed processing in the transmission and reception of the data, which are normally configured by plural transaction data.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A data transfer control method applicable to a peripheral device that performs data communications with a host by using a plurality of endpoints via a universal serial bus interface, comprising the steps of:

determining assignments for memories to be used as function-specified buffers and at least one common buffer that are adequately allocated to the plurality of endpoints respectively;

upon receipt of a token from the host, automatically determining a first endpoint for performing data transfer in response to the token within the plurality of endpoints;

if the common buffer is previously allocated to the first endpoint, actualizing a double buffer configuration for the first endpoint by using the function-specified buffer and the common buffer, so that the first endpoint proceeds to the data transfer in response to the token;

if the common buffer is not previously allocated to the first endpoint but is allocated to a second endpoint within the plurality of endpoints so that the second endpoint actualizes a double buffer configuration by using the function-specified buffer and the common buffer, making a decision as to whether the function-specified buffer or the common buffer for use in the second endpoint becomes vacant so as to determine a vacant buffer from among them;

automatically allocating the vacant buffer of the second endpoint as a new common buffer to the first endpoint, which in turn actualizes a double buffer configuration by using the function-specified buffer and the new common buffer, thus performing the data transfer in response to the token; and if a read buffer of the second endpoint corresponding to one of the function-specified buffer and the common buffer is not vacant, controlling the first endpoint to perform the data transfer using the function-specified buffer in response to the token.

2. A data transfer control method according to claim 1 wherein the first and second endpoints shares the common buffer for actualization of the double buffer configuration respectively.

3. A data transfer control method applicable to a peripheral device that performs data communications with a host by using at least a pair of a transmission endpoint and a reception endpoint via a universal serial bus interface, comprising the steps of:

determining assignments for memories to be used as function-specified buffers such as a transmission-specified buffer and a reception-specified buffer which are respectively allocated to the transmission endpoint and the reception endpoint, and one common buffer that is shared by the transmission endpoint and the reception endpoint for actualization of a double buffer configuration respectively;

upon receipt of a token from the host, controlling the transmission endpoint or the reception endpoint to perform data transfer in response to the token;

if the common buffer is previously allocated to a first endpoint corresponding to one of the transmission endpoint and the reception endpoint, actualizing a double buffer configuration for the first endpoint by using a pair of the function-specified buffer and the common buffer, so that the first endpoint proceeds to the data transfer in response to the token;

if the common buffer is not previously allocated to the first endpoint but is allocated to a second endpoint corresponding to the other one of the transmission endpoint and the reception endpoint so that a double buffer configuration is actualized for the second endpoint by using a pair of the function-specified buffer and the common buffer, making a decision as to whether the function-specified buffer or the common buffer becomes vacant so as to determine a vacant buffer from among them;

automatically allocating the vacant buffer as a new common buffer to the first endpoint, which in turn actualizes a double buffer configuration by using a pair of the function-specified buffer and the new common buffer, thus performing the data transfer in response to the token; and if a read buffer corresponding to one of the function-specified buffer and the common buffer that are allocated to the second endpoint is not vacant, controlling the first endpoint to perform the data transfer using the function-specified buffer in response to the token.

4. A data transfer control method according to claim 3 further comprising the steps of:

upon receipt of an OUT token, making a decision as to whether the common buffer is allocated to the reception endpoint for performing data reception in response to the OUT token or not;

if the common buffer is not allocated to the reception endpoint, making a decision as to whether data remain in the reception-specified buffer previously allocated to the reception buffer or not;

if the data remain in the reception-specified buffer of the reception endpoint, holding the data reception for a while;

if the data do not remain in the reception-specified buffer of the reception endpoint, writing reception data to the reception-specified buffer of the reception endpoint;

if the common buffer is allocated to the reception endpoint, making a decision as to whether data remain in a write buffer corresponding to one of the reception-specified buffer and the common buffer in the double buffer configuration of the reception endpoint or not;

if the data remain in the write buffer, holding the data reception for a while;

if the data do not remain in the write buffer, writing the reception data to the write buffer;

after a read buffer corresponding to the other one of the reception-specified buffer and the common buffer in the double buffer configuration of the reception endpoint becomes vacant, switching over functions between the write buffer and the read buffer with respect to the reception endpoint; and reading the reception data from the reception-specified buffer or the read buffer.

5. A data transfer control method according to claim 3 further comprising the steps of:

upon receipt of an IN token, making a decision as to whether a common buffer is allocated to the transmission endpoint for performing data transmission in response to the IN token or not;

if the common buffer is not allocated to the transmission endpoint, making a decision as to whether data remain in the transmission-specified buffer or not;

if the data do not remain in the transmission-specified buffer, holding the data transmission for a while;

if the data remain in the transmission-specified buffer, transmitting the data from the transmission-specified buffer;

if the common buffer is allocated to the transmission endpoint, making a decision as to whether data remain in a read buffer corresponding to one of the transmission-specified buffer and the common buffer in the double buffer configuration of the transmission endpoint or not;

if the data do not remain in the read buffer, holding the data transmission for a while;

if the data remain in the read buffer, transmitting the data from the read buffer;

if data still remain in a write buffer corresponding to the other of the transmission-specified buffer and the common buffer after the read buffer becomes vacant, switching over functions between the write buffer and the read buffer; and performing the data transmission using the transmission-specified buffer, or performing the data transmission using the read buffer upon detection of the IN token.

6. A USB device controller installed in a peripheral device that performs data communications with a host by using a plurality of endpoints via a universal serial bus interface, said USB device controller comprising:

a plurality of memories that are respectively assigned as function-specified buffers such as a transmission-specified buffer and a reception-specified buffer and at least one common buffer, which are adequately allocated to the plurality of endpoints such as a transmission endpoint and a reception endpoint respectively;

a plurality of control devices containing a transmission control device and a reception control device, each of which can actualize a double buffer configuration by using a pair of the function-specified buffer and the common buffer when performing data transfer in response to a token issued from the host or each of which uses only the function-specified buffer thereof to perform data transfer in response to a token issued from the host; and a buffer switch control device for if the common buffer is not allocated to a first control device corresponding to one of the transmission control device and the reception control device for performing the data transfer in response to the token from the host, detecting a vacant buffer from among a read buffer or a write buffer in the double buffer configuration actualized by a second control device corresponding to the other one of the transmission control device and the reception control device to which the common buffer is allocated, so that the buffer switch control device allocates the vacant buffer as a new common buffer to the first control device, wherein the reception control device controls data reception in response to an OUT token in accordance with a data reception control process and comprises:

a decision circuit, operative upon receipt of the OUT token, for making a decision as to whether the common buffer is allocated to the reception endpoint for performing data reception in response to the OUT token or not;

said decision circuit further operative if the common buffer is not allocated to the reception endpoint, for making a decision as to whether data remains in the reception-specified buffer previously allocated to the reception buffer or not;

a holding circuit operative if the data remains in the reception-specified buffer of the reception endpoint, for holding the data reception for a while;

a writing circuit, operative if the data does not remain in the reception-specified buffer of the reception endpoint, for writing reception data to the reception-specified buffer of the reception endpoint;

a decision device, operative if the common buffer is allocated to the reception endpoint, for making a decision as to whether data remains in a write buffer corresponding to one of the reception-specified buffer and the common buffer in the double buffer configuration of the reception endpoint or not;

a holding device, operative if the data remains in the write buffer, for holding the data reception for a while;

a writing device, operative if the data does not remain in the write buffer, for writing the reception data to the write buffer;

a switching device, operative after a read buffer corresponding to the other one of the reception-specified buffer and the common buffer in the double buffer configuration of the reception endpoint becomes vacant, for switching over functions between the write buffer and the read buffer with respect to the reception endpoint; and a reading device reading the reception data from the reception-specified buffer or the read buffer.

7. A USB device controller installed in a peripheral device that performs data communications with a host by using a plurality of endpoints via a universal serial bus interface, said USB device controller comprising:

a plurality of memories that are respectively assigned as function-specified buffers such as a transmission-specified buffer an a reception-specified buffer and at least one common buffer, which are adequately allocated to the plurality of endpoints such as a transmission endpoint and a reception endpoint respectively;

a plurality of control devices containing a transmission control device and a reception control device, each of which can actualize a double buffer configuration by using a pair of the function-specified buffer and the common buffer when performing data transfer in response to a token issued from the host, or each of which uses only the function-specified buffer thereof to perform data transfer in response to a token issued from the host; and a buffer switch control device for if the common buffer is not allocated to a first control device corresponding to one of the transmission control device and the reception control device for performing the data transfer in response to the token from the host, detecting a vacant buffer from among a read buffer or a write buffer in the double buffer configuration actualized by a second control device corresponding to the other one of the transmission control device and the reception control device to which the common buffer is allocated, so that the buffer switch control device allocates the vacant buffer as a new common buffer to the first control device, wherein the transmission control block controls data transmission in response to an IN token issued from the host in accordance with a data transmission control process comprising:

a decision circuit, operative upon receipt of the IN token for making a decision as to whether a common buffer is allocated to the transmission endpoint for performing data transmission in response to the IN token or not;

said decision circuit further operative if the common buffer is not allocated to the transmission endpoint, for making a decision as to whether data remain in the transmission-specified buffer or not;

a holding circuit, operative if the data does not remain in the transmission-specified buffer, for holding the data transmission for a while;

a transmitting circuit, operative if the data remains in the transmission-specified buffer, for transmitting the data from the transmission-specified buffer;

a decision device, operative if the common buffer is allocated to the transmission endpoint, for making a decision as to whether data remains in a read buffer corresponding to one of the transmission-specified buffer and the common buffer in the double buffer configuration of the transmission endpoint or not;

a holding device, operative if the data does not remain in the read buffer, for holding the data transmission for a while;

a transmission device, operative if the data remains in the read buffer, for transmitting the data from the read buffer;

a switching device, operative if data still remains in a write buffer corresponding to the other of the transmission-specified buffer and the common buffer after the read buffer becomes vacant, for switching over functions between the write buffer and the read buffer; and a transmission device performing the data transmission using the transmission-specified buffer, or performing the data transmission using the read buffer upon detection of the IN token.

8. A USB device controller applicable to a peripheral device that performs data communications with a host by using a transmission endpoint and a reception endpoint, comprising:

a USB interface connected with a USB bus for interconnection with the host;

a USB endpoint controller for performing data transmission and data reception by using a plurality of memories via the USB interface; and an external bus interface connected with the peripheral device, wherein the USB endpoint controller comprises a transmission control device for controlling the data transmission using a transmission endpoint that is configured by at least one memory, a reception control device for controlling the data reception using a reception endpoint that is configured by at least one memory, and an allocation controller for controlling allocation of the memories to the transmission endpoint and the reception endpoint respectively in response to a type of a token issued from the host wherein the allocation controller allocates a transmission-specified buffer, a reception-specified buffer and a common buffer to the memories respectively, so that in response to an OUT token, the reception endpoint actualizes a double buffer configuration using the reception-specified buffer and the common buffer, and the transmission endpoint actualizes a single buffer configuration using only the transmission-specified buffer, while in response to an IN token, the reception endpoint actualizes a single buffer configuration using only the reception-specified buffer, and the transmission endpoint actualizes a double buffer configuration using the transmission-specified buffer and the common buffer.

9. A USB device controller applicable to a peripheral device that performs data communications with a host by using a transmission endpoint and a reception endpoint, comprising:
- a USB interface connected with a USB bus for interconnection with the host;
- a USB endpoint controller for performing data transmission and data reception by using a plurality of memories via the USB interface; and
- an external bus interface connected with the peripheral device,
- wherein the USB endpoint controller comprises:
  - a transmission control device for controlling the data transmission using a transmission endpoint that is configured by at least one memory,
  - a reception control device for controlling the data reception using a reception endpoint that is configured by at least one memory, and
  - an allocation controller for controlling allocation of the memories to the transmission endpoint and the reception endpoint respectively in response to a type of a token issued from the host
  - wherein the allocation controller allocates function-specified buffers and a common buffer to the memories respectively, so that a first endpoint corresponding to one of the transmission endpoint and the reception endpoint actualizes a double buffer configuration using the function-specified buffer and the common buffer while a second endpoint corresponding to the other one of the transmission endpoint and the reception endpoint actualizes a single buffer configuration using the function-specified buffer thereof, and wherein the allocation controller detects a vacant buffer that is a read buffer selected from among the function-specified buffer and the common buffer being allocated to the first endpoint and becomes vacant, so that the vacant buffer is newly allocated to the second endpoint to allow actualization of the double buffer configuration.

10. A USB device controller installed in a peripheral device that performs data communications with a host by using a plurality of endpoints via a universal serial bus interface, said USB device controller comprising:
- a plurality of memories that are respectively assigned as function-specified buffers such as a transmission-specified buffer and a reception-specified buffer and at least one common buffer, which are adequately allocated to the plurality of endpoints such as a transmission endpoint and a reception endpoint respectively;
- a plurality of control devices containing a transmission control device and a reception control device, each of which can actualize a double buffer configuration by using a pair of the function-specified buffer and the common buffer when performing data transfer in response to a token issued from the host, or each of which uses only the function-specified buffer thereof to perform data transfer in response to a token issued from the host; and
- a buffer switch control device for if the common buffer is not allocated to a first control device corresponding to one of the transmission control device and the reception control device for performing the data transfer in response to the token from the host, detecting a vacant buffer from among a read buffer or a write buffer in the double buffer configuration actualized by a second control device corresponding to the other one of the transmission control device and the reception control device to which the common buffer is allocated, so that the buffer switch control device allocates the vacant buffer as a new common buffer to the first control device,
- wherein the reception control device controls data reception in response to an OUT token in accordance with a data reception control process and comprises:
  - upon receipt of the OUT token, means for making a decision as to whether the common buffer is allocated to the reception endpoint for performing data reception in response to the OUT token or not;
  - if the common buffer is not allocated to the reception endpoint, means for making a decision as to whether data remains in the reception-specified buffer previously allocated to buffer or not;
  - if the data remains in the reception-specified buffer of the reception endpoint, means for holding the data reception for a while;
  - operative if the data does not remain in the reception-specified buffer of the reception endpoint, means for writing reception data to the reception-specified buffer of the reception endpoint;
  - if the common buffer is allocated to the reception endpoint, means for making a decision as to whether data remains in a write buffer corresponding to one of the reception-specified buffer and the common buffer in the double buffer configuration of the reception endpoint or not;
  - if the data remains in the write buffer means for holding the data reception for a while;
  - if the data does not remain in the write buffer, means for writing the reception data to the write buffer;
  - after a read buffer corresponding to the other one of the reception-specified buffer and the common buffer in the double buffer configuration of the reception endpoint becomes vacant, means for switching over functions between the write buffer and the read buffer with respect to the reception endpoint; and
  - means for reading the reception data from the reception-specified buffer or the read buffer.

11. A USB device controller installed in a peripheral device that performs data communications with a host by using a plurality of endpoints via a universal serial bus interface, said USB device controller comprising:
- a plurality of memories that are respectively assigned as function-specified buffers such as a transmission-specified buffer and reception-specified buffer and at least one common buffer, which are adequately allocated to the plurality of endpoints such as a transmission endpoint and a reception endpoint respectively;
- a plurality of control devices containing a transmission control device and a reception control device, each of which can actualize a double buffer configuration by using a pair of the function-specified buffer and the common buffer when performing data transfer in response to a token issued from the host or each of which uses only the function-specified buffer thereof to perform data transfer in response to a token issued from the host; and a buffer switch control device for if the common buffer is not allocated to a first control device corresponding to one of the transmission control device and the reception control device for performing the data transfer in response to the token from the host, detecting a vacant buffer from among a read buffer or a write buffer in the double buffer configuration actualized by a second control device corresponding to the other one of the transmission control device and the reception control device to which the common buffer is allocated, so that the buffer switch control device allocates the vacant buffer as a new common buffer to the first control device, wherein the transmission control block controls data transmission in response to an IN token issued from the host in accordance with a data transmission control process comprising:

upon receipt of the IN token, means for making a decision as to whether a common buffer is allocated to the transmission endpoint for performing data transmission in response to the IN token or not;

if the common buffer is not allocated to the transmission endpoint, means for making a decision as to whether data remain in the transmission-specified buffer or not;

if the data does not remain in the transmission-specified buffer, meand for holding the data transmission for a while;

if the data remains in the transmission-specified buffer, means for transmitting the data from the transmission-specified buffer;

if the common buffer is allocated to the transmission endpoint, means for making a decision as to whether data remains in a read buffer corresponding to one of the transmission-specified buffer and the common buffer in the double buffer configuration of the transmission endpoint or not;

if the data does not remain in the read buffer means for holding the data transmission for a while;

if the data remains in the read buffer, means for transmitting the data from the read buffer;

if data still remains in a write buffer corresponding to the other of the transmission-specified buffer and the common buffer after the read buffer becomes vacant, means for switching over functions between the write buffer and the read buffer; and means for performing the data transmission using the transmission-specified buffer, or performing the data transmission using the read buffer upon detection of the IN token.

* * * * *